US010217195B1

(12) United States Patent
Agrawal et al.

(10) Patent No.: US 10,217,195 B1
(45) Date of Patent: Feb. 26, 2019

(54) GENERATION OF SEMANTIC DEPTH OF FIELD EFFECT

(71) Applicant: Amazon Technologies, Inc., Seattle, WA (US)

(72) Inventors: Amit Kumar Agrawal, Santa Clara, CA (US); Prakash Ramu, Sunnyvale, CA (US); Apoorv Chaudhri, Sunnyvale, CA (US); Noam Sorek, Zichron Yaacov (IL); Abhishek Singh, Mountain View, CA (US); Rohith Mysore Vijaya Kumar, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 26 days.

(21) Appl. No.: 15/489,572

(22) Filed: Apr. 17, 2017

(51) Int. Cl.
*G06K 9/00* (2006.01)
*G06K 9/34* (2006.01)
*G06K 9/40* (2006.01)
*H04N 5/262* (2006.01)
*G06T 5/00* (2006.01)
*G06T 7/11* (2017.01)
*G06T 7/194* (2017.01)

(52) U.S. Cl.
CPC .............. *G06T 5/003* (2013.01); *G06T 7/11* (2017.01); *G06T 7/194* (2017.01); *G06T 2207/10024* (2013.01)

(58) Field of Classification Search
USPC .................. 382/164, 154, 173, 255; 348/239
See application file for complete search history.

(56) References Cited

U.S. PATENT DOCUMENTS

| 7,843,493 | B2 * | 11/2010 | Katagiri | H04N 5/235 348/14.13 |
| 7,990,429 | B2 * | 8/2011 | Saito | H04N 5/232 348/222.1 |
| 8,928,772 | B2 * | 1/2015 | Pillman | G06T 5/004 348/222.1 |
| 9,412,170 | B1 * | 8/2016 | Wu | G06F 17/3028 |

(Continued)

OTHER PUBLICATIONS

Rhemann et al.; A Perceptually Motivated Online Benchmark for Image Matting; Microsoft Research Cambridge PhD Scholarship Program; Jun. 20, 2009; 8 pgs.

(Continued)

*Primary Examiner* — Kathleen Y Dulaney
(74) *Attorney, Agent, or Firm* — K&L Gates LLP

(57) ABSTRACT

Devices and techniques are generally described for image editing. In various examples, color image data and segmentation image data may be identified. In some examples, the segmentation image data may identify a first portion of the color image data as a foreground region and a second portion of the color image data as a background region. A segmentation boundary may be identified between the foreground region and the background region. A first area of the second portion may be identified, where the first area extends from the segmentation boundary to a first area outer boundary. A second area of the second portion may be identified, where the second area extends from the first area outer boundary to a second area outer boundary. A blended and blurred representation of the first area and the second area may be generated.

20 Claims, 10 Drawing Sheets

(56) References Cited

U.S. PATENT DOCUMENTS

| | | | |
|---|---|---|---|
| 2002/0140823 A1* | 10/2002 | Sakurai | H04N 5/232 348/207.99 |
| 2003/0235341 A1 | 12/2003 | Goturk et al. | |
| 2006/0232682 A1* | 10/2006 | Ono | H04N 5/23212 348/222.1 |
| 2010/0259647 A1* | 10/2010 | Gann | G06T 11/60 348/239 |
| 2011/0150349 A1* | 6/2011 | Kojima | G06K 9/00228 382/224 |
| 2011/0158551 A1* | 6/2011 | Sasaki | G06T 11/00 382/266 |
| 2013/0208093 A1* | 8/2013 | Sun | G06T 5/003 348/46 |
| 2015/0063681 A1 | 3/2015 | Bhardwaj et al. | |
| 2015/0139533 A1* | 5/2015 | Wu | G06K 9/00362 382/154 |
| 2015/0178970 A1* | 6/2015 | Pham | G06T 5/002 382/190 |
| 2015/0206312 A1 | 7/2015 | Luo et al. | |
| 2016/0125633 A1* | 5/2016 | Windmark | G06T 3/4038 382/103 |
| 2016/0353079 A1* | 12/2016 | Sawada | H04N 13/243 |
| 2017/0086712 A1 | 3/2017 | Mauro et al. | |
| 2017/0124717 A1 | 5/2017 | Baruch et al. | |
| 2017/0278289 A1* | 9/2017 | Marino | G06T 11/60 |
| 2017/0295355 A1 | 10/2017 | Tanaka | |

OTHER PUBLICATIONS

Cho et al.; An Introduction to Alpha Matting; Vienna Science and Technology Fund; Dec. 1, 2013; 51 pgs.
Shahrian et al.; Survey of Image Matting; Medical University of Viena; Dec. 1, 2013; 68 pgs.
Price; Challenges and Future Work in Matting; Adobe Research; Feb. 1, 2013; 80 pgs.
Shahrian et al.; Video Matting; Medical University of Viena; Dec. 1, 2013; 26 pgs.
Author Unknown; Alpha Matting Evaluation Website; retrieved on Mar. 28, 2017 from http://www.alphamatting.com; 1 page.
Author Unknown; Gaussian blur; retrieved on Apr. 12, 2017 from https://en.wikipedia.org/wiki/Gaussian_blur; 5 pages.

\* cited by examiner

GENERATION OF SEMANTIC DEPTH OF FIELD EFFECT

BACKGROUND

Cameras and other image sensors may be used to capture images and/or videos of a physical environment. Often, individuals take digital photographs of themselves and/or of others to memorialize a moment or to share photographs on social networks and/or over the internet. Images may be edited and altered to create desired effects. Image data may be stored and organized to aid in accessibility of particular image.

DETAILED DESCRIPTION

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Various examples described herein are directed to systems and methods for processing image content. Image data, as described herein, may refer to stand-alone frames of image data or to multiple frames of sequential image data, appended together to form a video. Image data may be comprised of a plurality of pixels arranged in a two-dimensional grid including an x component representing a horizontal direction in the grid and a y component representing a vertical direction or axis in the grid. A pixel may be the smallest addressable unit of image data in an image. A particular pixel may be identified by an x value, representing the horizontal position of the pixel in the two-dimensional grid and a y value, representing the vertical position of the pixel in the two-dimensional grid. Additionally, as described herein, pixels of image data may include depth data representing a distance between a surface represented by the pixel of image data and the image sensor (e.g., a depth sensor).

Figure 1A:
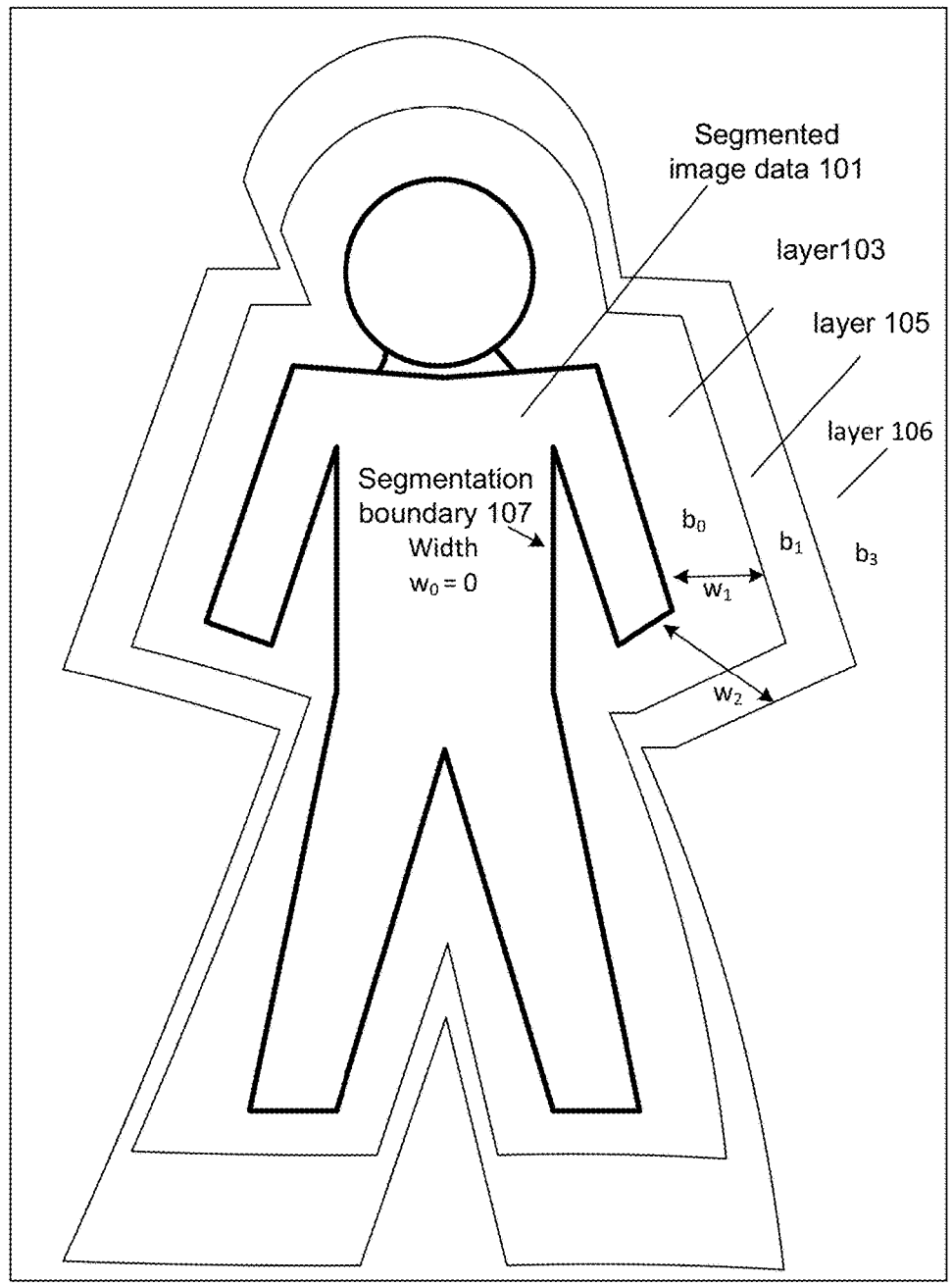
FIG. 1A depicts an example of a semantic depth of field effect applied to image data in accordance with various aspects of the present disclosure.

FIG. 1A depicts an example of a semantic depth of field effect applied to image data in accordance with various aspects of the present disclosure. Image data representing a human subject or other object of interest may be segmented from background image data to produce segmented image data 101, as described in further detail below. A semantic depth of field effect may be achieved by rendering image data representing the human subject or other object of interest in sharp focus while progressively blurring the background as the image data is traversed away from the subject or other object of interest. Various techniques may be used to generate segmentation image data. Segmentation image data (e.g., a segmentation mask) may classify pixels of image data as either foreground or background, depending on whether the pixel corresponds represents a foreground object (e.g., a human subject) or a portion of the background (e.g., the environment behind the human subject). Various techniques that may be used to segment image data are described below. However, it should be appreciated that the blurring, blending, bokeh effect generation, halo reduction, run-time compression, encoding and various other techniques described herein may be used irrespective of the particular segmentation method used to classify image data as foreground and background. In one example described below, depth data may be used to segment the image data representing the human or other object of interest from background image data.

Various image filters (e.g., low pass image filters) may be used to progressively blur pixels of background image data. The blurring effect may increase while moving away from segmentation boundary 107 (e.g., the blurring increases the further you move away in the image from the human subject or other object of interest). The segmentation boundary 107 may represent a boundary between a foreground region of image data (e.g., a region comprising pixels encoded with foreground indicator data) and a background region of the image data (e.g., a region comprising pixels encoded with background indicator data). Additionally, different blur values $b_n$ may be applied to various blurred layers, including first blurred layer 103, second blurred layer 105, etc. Blur values $b_n$ may be associated with the various blurred layers. For example, a blur value $b_n$ may be associated with a particular layer in a lookup table. Blur values $b_n$ may be proportionate to the distance of a particular layer from a segmentation boundary, where layers that are further from the segmentation boundary have higher blur values $b_n$. A blur value $b_n$ may represent the σ value of a low pass filter used to reduce the high frequency components of pixels. In various examples, the σ value of a low pass filter (such as a Gaussian filter) may relate to the size of a region of contiguous pixels used to generate a weighted average to be used as the new value for a pixel (e.g., the pixel being "blurred"). In general, the larger the blur value $b_n$ the larger the neighborhood of pixels used to generate the weighted average for a pixel to be blurred. Accordingly, the larger the blur value $b_n$, the more blurry a particular pixel will appear when rendered on a display. Blur values $b_n$ may thus refer to the σ value of a low pass filter used to blur a particular portion of image data. The blurring may be blended across the various layers using a gradient function so that no sharp contrasts are visible between various layers in the resulting image when rendered on a display. Additionally, various techniques are described for modulating the blurring techniques based on segmentation errors and depth holes (e.g., portions of image data for which no valid depth values are available).

Generation of a depth of field effect may result in a pleasing image emphasizing the human subject(s) and/or other object of interest while deemphasizing the background.

Figure 1B:
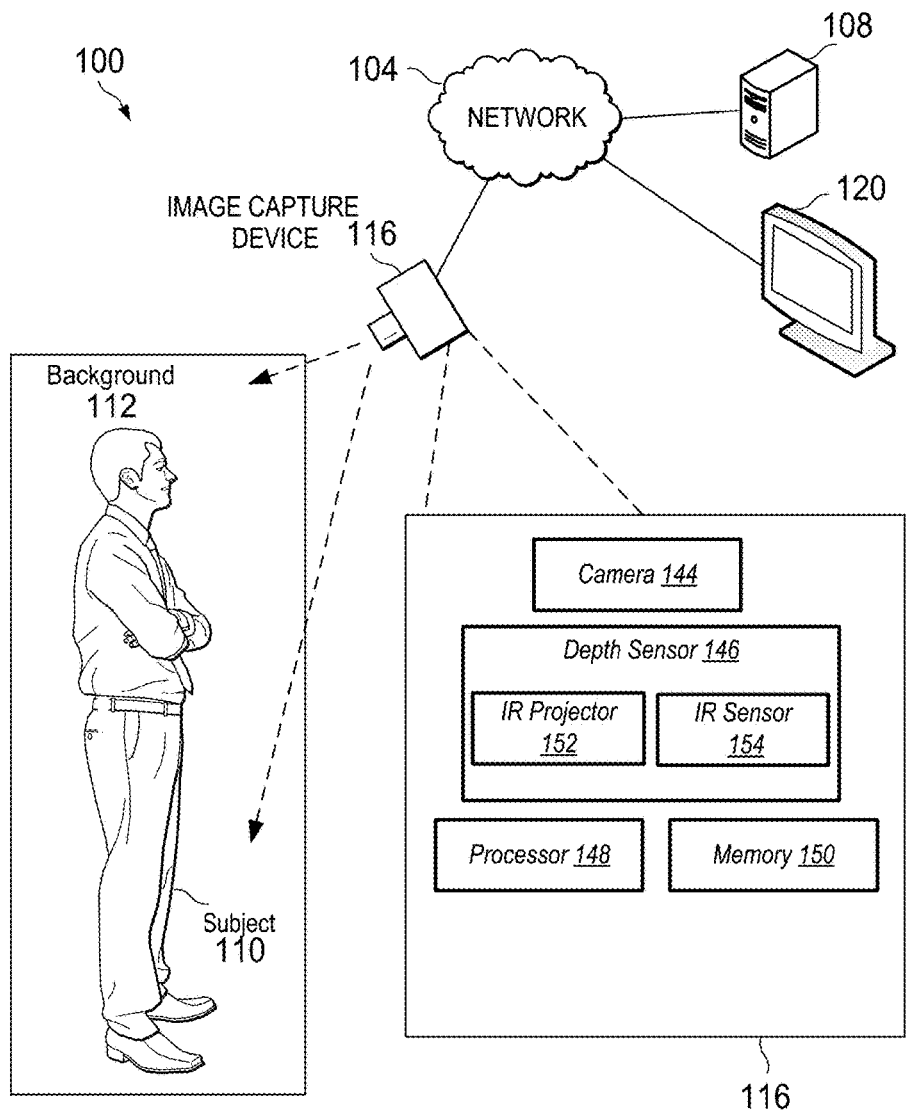
FIG. 1B is a diagram showing an example environment of an image capture system, arranged in accordance with various aspects of the present disclosure.

FIG. 1B is a diagram showing an example environment 100 of an image capture device 116, arranged in accordance with various aspects of the present disclosure. In various examples, the environment 100 may comprise image capture device 116. In various examples, image capture device 116 may be effective to capture an image of a subject 110. In some examples, image data representing an image of the subject 110 may also include image data representing a background 112 which may include image data representing one or more areas around and/or behind the subject captured by image capture device 116. Subject 110 may comprise any visible subject matter capable of being photographed by image capture device 116. In some common examples, subject 110 may comprise one or more people, animals, and/or objects. Background 112 may be, for example, a room, space, or other area in which the subject 110 is located. For example, subject 110 may comprise a human holding an article of clothing. In the example, background 112 may be the room in which the human subject 110 as well as anything captured in the image data other than the subject 110. For example, a bed or desk behind the subject 110 and visible in an image captured of the subject 110 may be considered part of background 112.

Image capture device 116 may include, for example, a digital camera module 144. The digital camera module 144 may comprise any suitable type of image sensor device or devices, such as a charge coupled device (CCD) and/or a complementary metal-oxide semiconductor (CMOS) sensor effective to capture image data from environment 100. In various examples, digital camera module 144 of image capture device 116 may comprise a 5 megapixel color (RGB) camera. Image capture device 116 may include one or more lenses and may be positioned so as to capture images of a portion of environment 100 disposed along an optical axis of image capture device 116. In various examples, lenses of image capture device 116 may be wide-angle lenses effective to capture an angle of view greater than about 55°. Image capture device 116 may include, or may be configured to be in communication with, a processing element (e.g., processor 148) and/or a memory (e.g., memory 150). Although in FIG. 1B image capture device 116 is shown as being angled downward toward a subject 110, image capture device 116 may be positioned at any angle within environment 100.

Image capture device 116 may further comprise a depth sensor 146. Depth sensor 146 may comprise, for example, an infrared projector 152 or any other infrared light source and an infrared sensor 154. Depth sensor 146 may be configured in communication with processor 148 and memory 150 of image capture device 116. Processor 148 may execute instructions stored in memory 150 to control infrared projector 152 to emit one or more patterns of structured infrared light. Infrared sensor 154 may detect the structured light reflected from surfaces of environment 100 (e.g., from surfaces of background 112). Processor 148 may construct a depth map of the infrared light detected by infrared sensor 154 based on deformations in the patterns of structured IR light reflected from irregular surfaces of environment 100. Depth data may be determined for each pixel in the depth map image data. In various examples, depth data may relate to a distance between the portion of environment 100 represented by a particular pixel and the IR sensor 154. More generally, depth data for a particular pixel may relate to a distance between the portion of environment 100 represented in the image data by the particular pixel and the image capture device 116.

In various examples, a depth map generated by depth sensor 146 may model the surface shape, reflectance, color, and/or microgeometry of the environment 100 (including subject 110 and background 112). Although in the examples above a structured light depth sensor is described, in other examples, a time-of-flight depth sensor may be used to generate the depth map used for segmentation of image data, in accordance with various embodiments of the present disclosure.

As described in further detail below, depth data may be used to automatically segment image data representing various items in environment 100 from image data representing other items in environment 100. For example, depth data may be used to segment image data representing a human from image data representing portions of a room in which the human is standing. In some other examples, depth data may be used to segment image data representing an object held in front of a human from the image data representing the human. In various cases, the depth data may allow for a coarse segmentation of image data from other, background image data. As described in further detail below, color image data captured by digital camera module 144 may be used to refine and improve the coarse segmentation of image data performed using the depth data from depth sensor 146.

Each pixel of image data captured by image capture device 116 may comprise color information generated by digital camera module 144 and depth information generated by depth sensor 146. In some examples, digital camera module 144 and depth sensor 146 may be physically located in a known, spaced relationship within a casing and/or frame of image capture device 116. Due to the known placement of digital camera module 144 vis-à-vis depth sensor 146, color image data (e.g., RGB data) captured by digital camera module 144 may be aligned with (e.g., "mapped to") depth data captured by depth sensor 146. In turn, both color information and depth information may be known for pixels of image data captured by image capture device 116. The pixels of image data may, in turn, correspond to particular positions within environment 100.

For example, image capture device 116 may be configured in communication with one or more computing devices 108 via a network 104. Network 104 may be, for example, the internet, an intranet, a wide area network, a local area network, or the like. In some examples, image capture device 116 may send image data to one or more other computing devices and/or display devices (e.g., display 120) over network 104. For example, image capture device 116 may send image data representing subject 110 and/or background 112 to a remote computing device 108 for image processing, storage, and/or display.

A user of image capture device 116 may use a companion software application executing on the user's computing device (e.g., a smartphone) to control image capture device 116 to capture images, video, and/or audio (e.g., in instances in which image capture device 116 includes a microphone) from environment 100.

For example, subject 110 may be a human user of image capture device 116. Subject 110 may control image capture device 116 to capture an image of subject 110 and the portion of the environment 100 that is within the field of view of the lens of image capture device 116 (e.g., background 112). In some examples, subject 110 may control image capture device 116 to process captured image data and/or send image data to another device or display.

As is described in further detail below, the user of image capture device 116 may control the image capture device 116 in a variety of ways. For example, the user (e.g., subject 110) may control image capture device 116 using voice commands, a companion software application installed on and executed by a mobile device, a desktop computing device, or other terminal, or by a dedicated hardware controller configured to be in communication with image capture device 116. In various examples, the controller device (not shown in FIG. 1B) may communicate with image capture device 116 using network 104 which may be, for example, a Wi-Fi network. In some other examples, the controller device may communicate with image capture device 116 using an infrared signal or other short-range wireless signal (e.g., a Bluetooth signal), wired communication, and/or by a user interface of image capture device 116. In examples where image capture device 116 is effective to communicate wirelessly, image capture device 116 may include a wireless transmitter and/or receivers (not shown in FIG. 1B).

Figure 2:
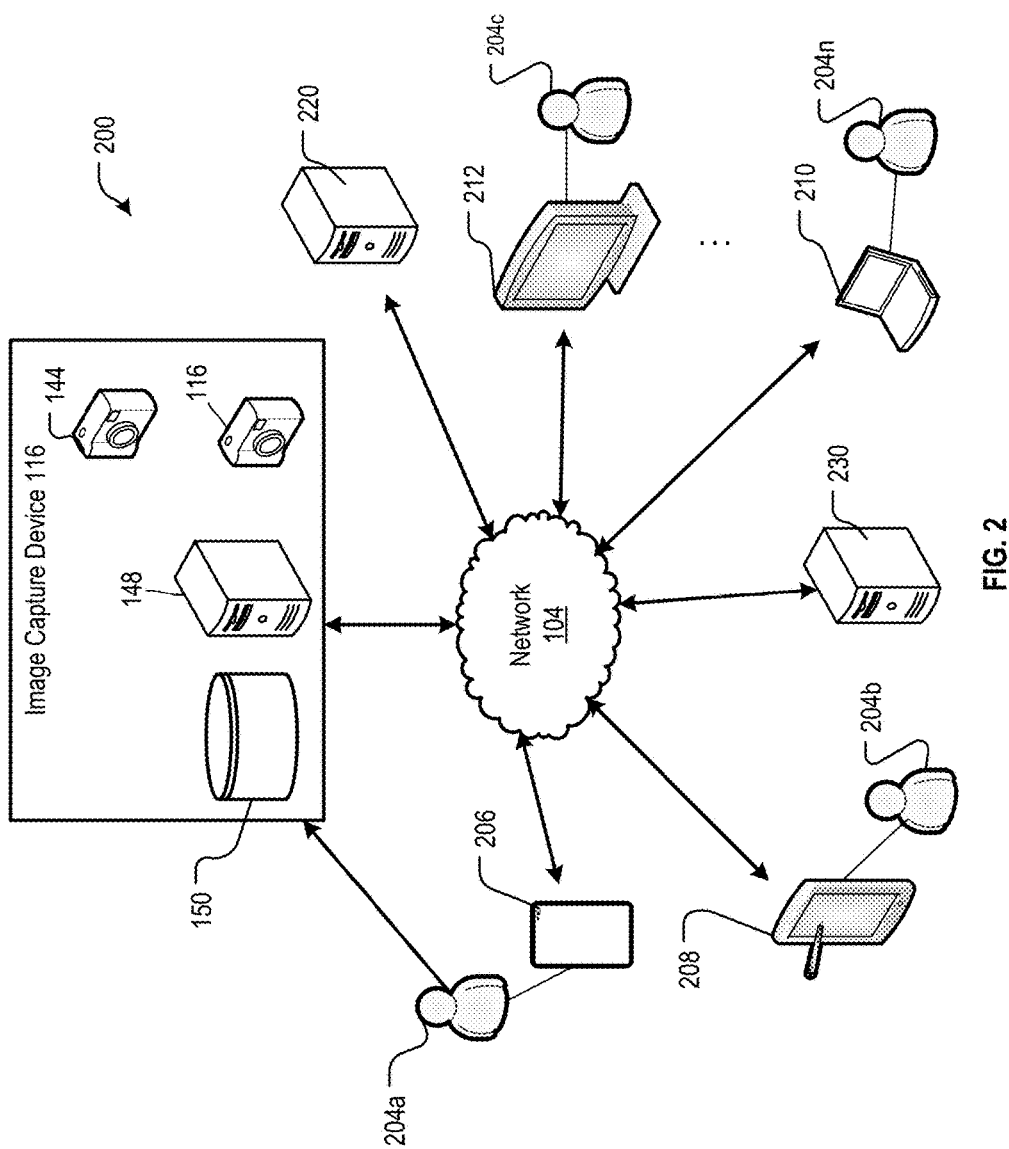
FIG. 2 is a diagram showing an example environment with which the image capture system depicted in FIG. 1 may be used, in accordance with various aspects of the present disclosure.

FIG. 2 is a diagram showing one example of an environment 200 with which the image capture system depicted in FIG. 1B may be used, in accordance with various aspects of the present disclosure. The environment 200 comprises image capture device 116 and users 204a, 204b, 204c, 204n. Each user 204a, 204b, 204c, and 204n may use one or more user devices such as, for example, mobile device 206, tablet computer 208, laptop computer 210, and/or display device 212. Although four users 204a, 204b, 204c, 204n are shown, any suitable number of users may be part of the environment 200. Also, although each user 204a, 204b, 204c, 204n shown in FIG. 2 is associated with a particular device (such as mobile device 206 associated with user 204a, tablet computer 208 associated with user 204b, display device 212 associated with user 204c, and laptop computer 210 associated with user 204n), each user 204a, 204b, 204c, 204n may use additional user devices or fewer user devices from what is shown. Additionally, each user 204a, 204b, 204c, 204n may use different user devices apart from what is shown in environment 200 of FIG. 2.

Image capture device 116 may perform the various utilities described herein including, for example, automatic object segmentation in image data. As shown and described, image capture device 116 may comprise one or more digital camera modules 144, one or more depth sensors 146, one or more processors 148, and/or one or more memories 150. Although not depicted in FIG. 2, image capture device 116 may also comprise one or more infrared sensors and/or one or more image filters used for image processing. In some examples, the memory 150 may store images captured by the one or more digital camera modules 144, or received from the various user devices, as well as instructions for image data segmentation, as described herein. In some examples, the various components 144, 146, 148, and/or 150 of the image capture device 116 may be at a common geographic location and/or may be distributed across multiple geographic locations. For example, one or more processors 148 effective to perform image processing of image data captured by image capture device 116 (e.g., object segmentation of image data) may be implemented in whole or in part as a cloud or Software as a Service (SaaS) system. In some examples, the image capture device 116 may perform object segmentation of image data, etc. on images received from multiple different users 204a, 204b, 204c, 204n (e.g., via their associated cameras, computing devices, or other devices). In various other examples, image capture device 116 may perform object segmentation of image data and various other image processing techniques described herein using image data captured locally by the one or more digital camera modules 144. Various user devices (such as mobile device 206 associated with user 204a, tablet computer 208 associated with user 204b, display device 212 associated with user 204c, and laptop computer 210 associated with user 204n) may include a companion application effective to send instructions to image capture device 116. For example, user 204a may execute a companion application on mobile device 206 and may send commands to image capture device 116. In various examples, user 204a may use the companion application to capture image data with image capture device 116 and to segment various objects represented in the captured image data (e.g., objects of interest) from other objects represented in the captured image data (e.g., background objects). In some further examples, the various user devices (such as mobile device 206 associated with user 204a, tablet computer 208 associated with user 204b, display device 212 associated with user 204c, and laptop computer 210 associated with user 204n) may perform various image processing techniques based on image data (including segmented image data) received from image capture device 116. For example, the various user devices may generate semantic depth of field effects, bokeh effects, multi-layer blending, and/or other image processing techniques described in further detail below.

The various components of the environment 200 may be in communication with one another via a network 104. As described previously, the network 104 may be and/or comprise any suitable wired or wireless network configured according to any suitable architecture or protocol. In some examples, the network 104 may comprise the Internet.

User devices, such as mobile device 206, tablet computer 208, display device 212, and laptop computer 210 may be utilized to control image capture device 116 to capture still and/or video images. In various examples, user devices may execute a companion application to control operation of image capture device 116 and/or display 120 (e.g., a projector device). Similarly, in some examples, user devices such as mobile device 206, tablet computer 208, display device 212, and laptop computer 210 may be utilized to send image data captured by and/or processed by image capture device 116 to integrated or external display devices for display. For example, image capture device 116 may comprise a short throw projector device (not shown in FIG. 2). A user device such as tablet computer 208 may be effective to send an instruction to image capture device 116 (e.g., through a companion application) to send image data to the short throw projector device for display.

In some examples, user devices including mobile device 206, tablet computer 208, display device 212, and/or laptop computer 210 may be configured to communicate with other components of the environment 200 utilizing, for example, a wired or wireless connection. For example, mobile device 206, tablet computer 208, display device 212, and/or laptop computer 210 may send and receive data (such as, for example, commands and/or image data) via a wired connection, such as Universal Serial Bus (USB), or wireless connection, such as near field communication (NFC) or Bluetooth. In some examples, the user devices may be configured to receive still images and/or video directly from image capture device 116, for example, via the network 104. Although user devices are described as mobile device 206, tablet computer 208, display device 212, and/or laptop computer 210, the user devices may be any suitable type of computing device comprising at least one processor and non-transitory computer-readable memory. In some examples, the user devices may be configured to receive image frames captured by the image capture device 116. In some examples, the user devices, such as mobile device 206, tablet computer 208, display device 212, and/or laptop computer 210, may be configured to communicate on a cellular or other telephone network.

In various examples, users, such as users 204a, 204b, 204c, 204 may control image capture device 116 using audible commands. For example, a user 204a may speak a "wake word" that may be a spoken, audible command. A wake word may be, for example, a word or phrase for which a wake word engine of image capture device 116 continually listens. A microphone of image capture device 116 may detect the spoken wake word and, in response, subsequent audio captured by the microphone may be processed to detect further audible commands and/or the subsequent audio received by the microphone of image capture device 116 may be transmitted to a voice recognition server 220. In the example, user 204a may "wake" the image capture device 116 to further voice commands using the wake word, and may thereafter speak an audible command for image capture device 116 to take a video or take a picture. Similarly, a user may speak an audible command for image capture device 116 to segment image data representing a particular object in the image or video from other image data. For example, a user may speak an audible command for the image capture device 116 to segment image data representing an article of clothing from image data representing the remainder of the captured image or vide. Audio may be transmitted/streamed from image capture device 116 over network 104 to voice recognition server 220 in any audio file format, such as mp3, mp4, or the like. Voice recognition server 220 may receive the transmitted or streamed audio. Upon determining that the audio content has reached an endpoint, voice recognition server 220 may analyze the received audio stream and may translate the audio stream into natural language. Voice recognition server 220 may determine whether or not the natural language corresponds to a command. If so, the voice recognition server 220 may send the command over network 104 to image capture device 116. For example, a user 204a may speak the command, "Take a picture" to image capture device 116. Image capture device 116 may transmit the voice command to voice recognition server 220. Voice recognition server 220 may analyze the audio stream and may translate the audio stream into natural language. Voice recognition server 220 may determine that the natural language "Take a picture" corresponds to a command effective to instruct image capture device 116 to capture an image using digital camera module 144 and/or depth sensor 146. Voice recognition server 220 may send the command over network 104 to image capture device 116. The command may be effective to cause image capture device 116 to capture an image.

In other examples, a user 204a may speak the command, "Take picture" to image capture device 116. Image capture device 116 may transmit the voice command to voice recognition server 220. Voice recognition server 220 may analyze the audio stream and may translate the audio stream into natural language. Voice recognition server 220 may determine that the natural language "Take picture" corresponds to a command effective to instruct image capture device 116 to segment image data representing a human subject or other object of interest from other image data in a selected image. In various examples, the selected image may be stored in memory 150 or may be stored in a different memory accessible by image capture device 116 over network 104. Voice recognition server 220 may send the command over network 104 to image capture device 116. The command may be effective to cause image capture device 116 to access and perform the image processing operations related to segmentation of the clothing from the background image data, as described in further detail below.

In some embodiments, the microphone for capturing voice commands may be a far field microphone. In some embodiments, the microphone may be provided on a different device separate from the image capture device 116. The processing of the voice command and/or transmission of the audio to the voice recognition server 220 may similarly be performed by a device other than the image capture device 116.

In various examples in which the various image processing techniques (e.g., object segmentation in image data) are implemented at least in part in a cloud service or SaaS environment, such techniques may be performed at an image processing device 230. Although depicted as different computing devices in FIG. 2, in some examples, image processing device 230 and voice recognition server 220 may be implemented in the same housing. Similarly, in various examples, image processing device 230 may be implemented in the same housing as image capture device 116. In yet other examples, image processing device 230 may receive image data captured by image capture device 116 via network 104. After performing image processing in accordance with the various techniques described herein, image processing device 230 may send transformed image data over network 104 to image capture device 116 and/or to one or more user devices and/or other computing devices, such as, for example, a social media server. In some examples, processed image data may be sent to a computer vision system (not shown). The computer vision system may be programmed to recognize various features of an object or subject depicted in the processed images. For example, the computer vision system may be programmed to recognize a face of a subject, a type, category, brand, or designer, of clothing, etc. Clothes may be identified by matching a particular item of clothing segmented from other image data or otherwise tagged within image data to a particular item of clothing known to have been purchased by the user of image capture device 116 or stored in a database, such as an online-shopping catalog database. For example, the computer vision system may be in communication with one or more other computing systems that include profile information related to the subject. The computer vision system may identify particular articles of clothing worn by a subject by querying other computer systems, such as a server of an online-shopping website from which the user has purchased those articles of clothing. Similarly, the computer vision system may identify a subject by querying a computer system hosting a social media platform, which can provide to the computer vision system information about the subject (e.g., information about clothing purchased by the subject, worn by the subject in photos available to the social media platform, owned by the subject from a virtual wardrobe created by the subject, or other types of information available to social media platforms or made available to the computer vision system) to assist with the identification of that clothing by the computer vision system. In various examples, the computer vision system may be effective to insert metadata into the perspective-transformed image. In some examples, such metadata may be optionally displayed when image data is projected by image capture device 116. The metadata may comprise a metadata "tag," or a hyperlink that, which selected by the user, will direct the user to a retail website where the particular article of clothing can be purchased. Additionally, image processing techniques, such as the object segmentation techniques for image data described herein, may be used to isolate and label clothing image data to build databases of clothing image data.

Figure 3:
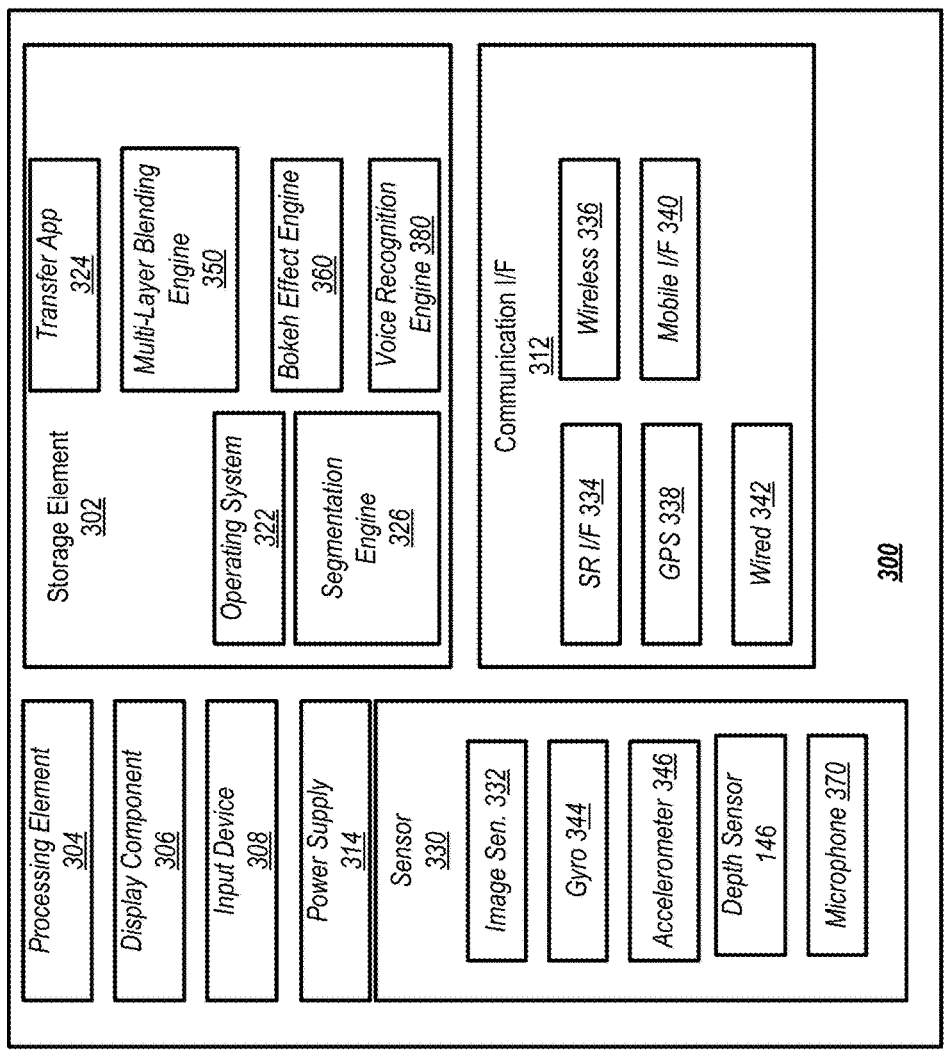
FIG. 3 is a block diagram showing an example architecture of a computing device in which the image capture system described in the present disclosure, or a portion thereof, may be implemented, in accordance with various embodiments described herein.

FIG. 3 is a block diagram showing an example architecture 300 of a user device, such as the image capture devices, cameras, display devices, mobile devices, and/or other computing devices described herein. It will be appreciated that not all user devices will include all of the components of the architecture 300 and some user devices may include additional components not shown in the architecture 300. The architecture 300 may include one or more processing elements 304 for executing instructions and retrieving data stored in a storage element 302. The processing element 304 may comprise at least one processor. Any suitable processor or processors may be used. For example, the processing element 304 may comprise one or more digital signal processors (DSPs). In some examples, the processing element 304 may be effective to perform object segmentation techniques for image data, as described above. The storage element 302 can include one or more different types of memory, data storage, or computer-readable storage media devoted to different purposes within the architecture 300. For example, the storage element 302 may comprise flash memory, random-access memory, disk-based storage, etc. Different portions of the storage element 302, for example, may be used for program instructions for execution by the processing element 304, storage of images or other digital works, and/or a removable storage for transferring data to other devices, etc.

The storage element 302 may also store software for execution by the processing element 304. An operating system 322 may provide the user with an interface for operating the user device and may facilitate communications and commands between applications executing on the architecture 300 and various hardware thereof. A transfer application 324 may be configured to send and/or receive image and/or video data to and/or from other devices (e.g., a mobile device, image capture device, and/or display device). In some examples, the transfer application 324 may also be configured to upload the received images to another device that may perform processing as described herein (e.g., a mobile device, another computing device, and/or image processing device 230).

In various examples, a segmentation engine 326 may be effective to use depth data and color domain data to classify pixels of image data as either foreground or background using foreground indicator data and background indicator data. Processing techniques of segmentation engine 326 are described in further detail below. Multi-layer blending engine 350 may be an image processing engine effective to progressively blur layers of background image data as an image is traversed away from a subject or object of interest. Additionally, multi-layer blending engine 350 may blend different layers together using a blending strength parameter, as described in further detail below. As described in further detail below, a bokeh effect engine 360 may be effective to detect regions of pixels in the RGB image 402 with an average luminance that is higher than the average luminance of a local neighborhood of pixels. The bokeh effect engine 360 may be further effective to apply a disk-shaped blur to such high luminance regions of pixels and may apply a disk-shaped filter to the regions to produce a bokeh effect in the RGB image data.

When implemented in some user devices, the architecture 300 may also comprise a display component 306 (e.g., display 120 depicted in FIG. 1B). The display component 306 may comprise one or more light-emitting diodes (LEDs) or other suitable display lamps. Also, in some examples, the display component 306 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 300 may also include one or more input devices 308 operable to receive inputs from a user. The input devices 308 can include, for example, a push button, touch pad, touch screen, wheel, joystick, keyboard, mouse, trackball, keypad, light gun, game controller, or any other such device or element whereby a user can provide inputs to the architecture 300. These input devices 308 may be incorporated into the architecture 300 or operably coupled to the architecture 300 via wired or wireless interface. In some examples, architecture 300 may include a microphone 370 for capturing sounds, such as voice commands. Voice recognition engine 380 may interpret audio signals of sound captured by microphone 370. In some examples, voice recognition engine 380 may listen for a "wake word" to be received by microphone 370. Upon receipt of the wake word, voice recognition engine 380 may stream audio to a voice recognition server for analysis, as described above in reference to FIG. 2. In various examples, voice recognition engine 380 may stream audio to external computing devices via communication interface 312.

When the display component 306 includes a touch-sensitive display, the input devices 308 can include a touch sensor that operates in conjunction with the display component 306 to permit users to interact with the image displayed by the display component 306 using touch inputs (e.g., with a finger or stylus). The architecture 300 may also include a power supply 314, such as a wired alternating current (AC) converter, a rechargeable battery operable to be recharged through conventional plug-in approaches, or through other approaches such as capacitive or inductive charging.

The communication interface 312 may comprise one or more wired or wireless components operable to communicate with one or more other user devices such as the user devices depicted in FIG. 2 (including mobile device 206 associated with user 204a, tablet computer 208 associated with user 204b, display device 212 associated with user 204c, and laptop computer 210 associated with user 204n). For example, the communication interface 312 may comprise a wireless communication module 336 configured to communicate on a network, such as the network 104, according to any suitable wireless protocol, such as IEEE 802.11 or another suitable wireless local area network (WLAN) protocol. A short range interface 334 may be configured to communicate using one or more short range wireless protocols such as, for example, near field communications (NFC), Bluetooth, Bluetooth LE, etc. A mobile interface 340 may be configured to communicate utilizing a cellular or other mobile protocol. A Global Positioning System (GPS) interface 338 may be in communication with one or more earth-orbiting satellites or other suitable position-determining systems to identify a position of the architecture 300. A wired communication module 342 may be configured to communicate according to the USB protocol or any other suitable protocol. In various examples where architecture 300 represents image capture device 116 (shown in FIG. 1B), mobile interface 340 may allow image capture device 116 to communicate with one or more other computing devices such as the various computing devices shown in FIG. 2. For example, image capture device 116 may receive a command from a user device, an application of a user device, or a voice recognition server to capture an image. Image capture device 116 may receive a command from the user device to send the captured image frame to the mobile device or to a social media site.

The architecture 300 may also include one or more sensors 330 such as, for example, one or more position sensors, image sensors, and/or motion sensors. An image sensor 332 is shown in FIG. 3. Some examples of the architecture 300 may include multiple image sensors 332. For example, a panoramic camera system may comprise multiple image sensors 332 resulting in multiple images and/or video frames that may be stitched and may be blended to form a seamless panoramic output.

Motion sensors may include any sensors that sense motion of the architecture including, for example, gyro sensors 344 and accelerometers 346. Motion sensors, in some examples, may be used to determine an orientation, such as a pitch angle and/or a roll angle, of image capture device 116 and/or display device 120 (shown in FIG. 1B). The gyro sensor 344 may be configured to generate a signal indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. The accelerometer 346 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 338 may be utilized as a motion sensor. For example, changes in the position of the architecture 300, as determined by the GPS interface 338, may indicate the motion of the GPS interface 338. Depth sensor 146 may be effective to determine a distance between image capture device 116 and a surface detected by depth sensor 146. In some examples, the depth sensor 146 may determine the contours of the surface and may be capable of using computer vision techniques to recognize facial patterns or other markers within the field of view of the depth sensor 146's infrared sensor. In some examples, the depth sensor 146 may include an infrared projector and camera. Processing element 304 may build a depth map based on detection by the infrared camera of a pattern of structured light displayed on a surface by the infrared projector. In some other examples, the depth sensor 146 may include a time of flight camera that may compute distance based on the speed of light by measuring the time of flight of a light signal between a camera of the depth sensor 146 and a surface of environment 100 (shown in FIG. 1B). In some examples, processing element 304 may be effective to determine the location of various objects in the physical environment within the field of view of image capture device 116 based on the depth map created by the depth sensor 146. As noted above, in some examples, non-infrared depth sensors, such as passive stereo camera pairs, or non-identical camera pairs, may be used in image capture device 116 in place of, or in addition to, infrared light sources of depth sensor 146. Processing element 304 may build a depth map based on detection by non-infrared depth sensors of a pattern of light displayed on a surface by a light source. Processing element 304 may be effective to determine the location of various objects in the physical environment within the field of view of image capture device 116 based on the depth map created by one or more non-infrared depth sensors.

Figure 4A:
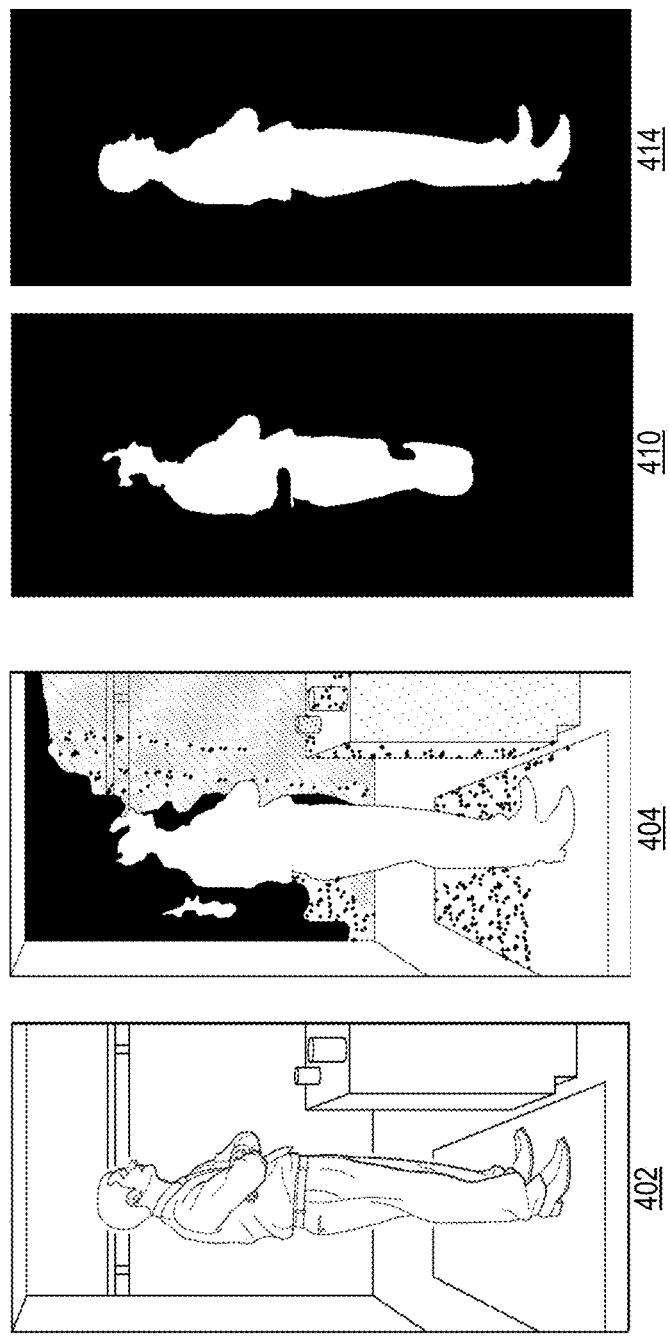
FIG. 4A depicts an RGB image, a depth image, an image depicting main blob selection, and a segmented image, in accordance with various aspects of the present disclosure.

FIG. 4A depicts an RGB image 402, a depth image 404, an image 410 depicting main blob selection, and a segmented image 414. In various examples, image capture device 116 may capture the RGB image 402 and the depth image 404 of a human subject (or of another object of interest). Image data in both the RGB image 402 and the depth image 404 may represent both the object of interest and the background (e.g., the environment in which the object of interest is located). Processor 148 may be effective to segment image data representing the object of interest from image data representing the background. In some examples, a main cluster of similar depth values in the depth image captured by depth sensor 146 may represent a coarse segmentation generated from depth image. The main cluster of image data is depicted in image 410. In image 410 pixels encoded with foreground indicator data (e.g., "foreground pixels") are displayed in white, while pixels encoded with background indicator data (e.g., "background pixels") are shown in black. The main cluster of the image data representing the object of interest may be further refined using data from the RGB image 402, depth image 404, and, in some cases training data to generate segmentation image 414. In some examples, digital camera module 144 of image capture device 116, depicted in FIG. 1B, may be effective to generate image data representing RGB image 402. Similarly, depth sensor 146 of image capture device 116 may be effective to generate depth data representing the depth image 404. In some other examples, an RGB camera used to generate the RGB image 402 may be a separate device, and/or may be located in a different housing, relative to a depth sensor 146 used to generate the depth image 404.

Image segmentation poses a challenging problem in computer vision (CV). For example, it is challenging to obtain pixel level accurate segmentation of objects and humans (figure ground separation) relative to background image data. Even in constrained environments, where the background is partially known (e.g., bin picking) or can be obtained using additional images, obtaining an accurate segmentation is highly challenging.

For indoor applications, the image segmentation problem may be further confounded by unconstrained indoor environments, challenging low light conditions, significant changes in illumination (e.g., day vs night), low contrast between a subject and the background, non-homogenous colors on a subject's clothing, etc. Additionally, some structured light depth sensors operating in the IR domain may have difficulty generating depth data for items with low IR reflectivity (e.g., non-reflective clothing), hair, dark backgrounds, sunlight, incandescent lighting and/or far-away backgrounds. When depth data is unable to be generated using an IR sensor, the resulting depth image (e.g., depth image 404) may comprise "depth holes", which are pixels that do not include depth data. These depth holes typically occur where the depth sensor has not provided any usable depth information for various reasons. Structured light depth sensors may typically generate more holes for a given depth image relative to an equivalent time-of-flight IR depth sensor. In various examples, depth sensor 146 may be unable to generate depth information for all pixels in an image under various challenging conditions. As such, the depth images representing an environment with challenging conditions may include a high incidence of depth holes in the captured depth image. Examples of challenging conditions may include an image captured in bright sunlight, an image captured in incandescent lighting, and/or an image captured where the subject is wearing dark, unreflective clothing, etc.

Although recent advances in deep learning and convolutional neural network (CNN) processing have shown significant improvements in semantic image segmentation, such techniques are often quite demanding in terms of run-time and/or memory resources. It can pose a challenge to run image segmentation using a relatively low-powered, low memory, embedded system while maintaining a low latency output. For example, in some examples, image capture device 116 may include a microprocessor of limited speed and/or graphical processing capability. However, the techniques described herein may produce high quality image segmentation output at low latency even with limited graphical processing power. Additionally, while in some examples cloud computing may be used to enhance or speed up the image segmentation techniques described herein, in at least some other examples, image segmentation may be performed entirely on-device. For example, processor 148 of image capture device 116 (depicted in FIG. 1B) may execute the image segmentation techniques described below.

In an example, a graphics processing unit (GPU) of processor 148 of image capture device 116 may comprise 84 compute units running at about 500 MHz with boost clock. By contrast, the TITAN X GPU by NVIDIA Corporation of Santa Clara, Calif., has approximately 3000 CUDA cores (compute units) running at 1531 MHz with boost clock. In the illustrated embodiment, the GPU of image capture device 116 has about 100 times less computation power than NVIDIA TITAN X. In terms of CPU processing, the image capture device 116 in this example may have a CPU that is 4 times slower than a standard desktop computing device with 16 GB RAM and a Core i7 microprocessor by Intel Corporation of Santa Clara, Calif. It should be appreciated that image capture device 116 may include any type of processor and/or memory. The examples described above are mentioned merely to illustrate that the low latency image segmentation techniques described herein may be performed without high end GPUs, fast processing units, and large amounts of memory.

In some examples, CNN-based approaches may require large amounts of memory to store the CNN model and intermediate layer results in a forward pass. Densely Connected Convolutional Networks (DenseNet) architecture may be used to reduce network size, but some embodiments of the present invention may perform these processing methods using less than 150 MB available for CV processing.

Image Segmentation Techniques

Classical CV segmentation approaches uses a MRF/CRF framework (Markov random field/conditional random field), where the energy (cost) of segmentation is defined as:

$$E(x)=\Sigma\Phi_i(x_i,y_i)+\Sigma\Phi(x_i,x_j,y_i,y_j) \quad (1)$$

where x denotes pixels and y denotes the labeling of each pixel. For binary segmentation, labels for pixels are "foreground" or "background." Pixels may be encoded, classified, or otherwise labeled as either "foreground" or "background" by encoding the pixels with foreground indicator data or background indicator data. Foreground indicator data and background indicator data may comprise one or more bits that indicate the label of the pixel. The energy terms are dependent on the labels. $\Phi_i(x_i,y_i)$ denotes the cost of a pixel $x_i$ taking the label $y_i$. Popular approaches include learning filters (RGB domain) that can give a good local estimate of probability of foreground vs background. Other approaches may utilize deep learning and CNN to learn these filters and obtain the local estimates using learned filters.

The clique potential $\Phi_{ij}(x_i,x_j,y_i,y_j)$ denotes the cost of neighboring pixels taking different labels. In order to minimize the energy, an inference algorithm is used. Graph-cuts is an inference algorithm that can provide a global optimum under sub-modular cost functions. However, inference for Graph-cuts is computationally expensive and has difficulty incorporating higher-order clique potentials and long range interactions between pixels.

Gaussian conditional random fields (GCRFs) may be used to model the segmentation problem and can lead to fast inference. GCRFs can also be motivated from a quadratic cost function point of view. In some examples, the segmentation problem may be formulated as a quadratic optimization. Local probabilities may be computed for each pixel using a graphical model. The local probabilities may be refined using a non-local graph structure in the color (RGB) image. Instead of modeling the segmentation as a binary variable (0 or 1), the segmentation model may instead be modeled as a continuous variable between 0 and 1 using multi-matting techniques. The energy of the system may then be modeled as a quadratic least square function, which leads to a sparse linear system. Accordingly, the inference can be done in a fast manner.

The segmentation techniques described below may be used to reduce latency while executing with a low computational budget. Designing a large energy minimization problem where inference is run for each pixel is prohibitive. Instead, a cascade approach is used, which allows for an initial quick and low-cost inference for the majority of pixels followed by successively refined "foreground" or "background" label estimates for the remaining pixels. For example, if an efficient human detector algorithm is used, pixels which are spatially away from the detected human and have a large depth difference from the detected human pixels may be labeled as "background" without running an expensive inference. Pixels near the boundary of human/background boundary may require more computationally expensive inference.

Figure 5:
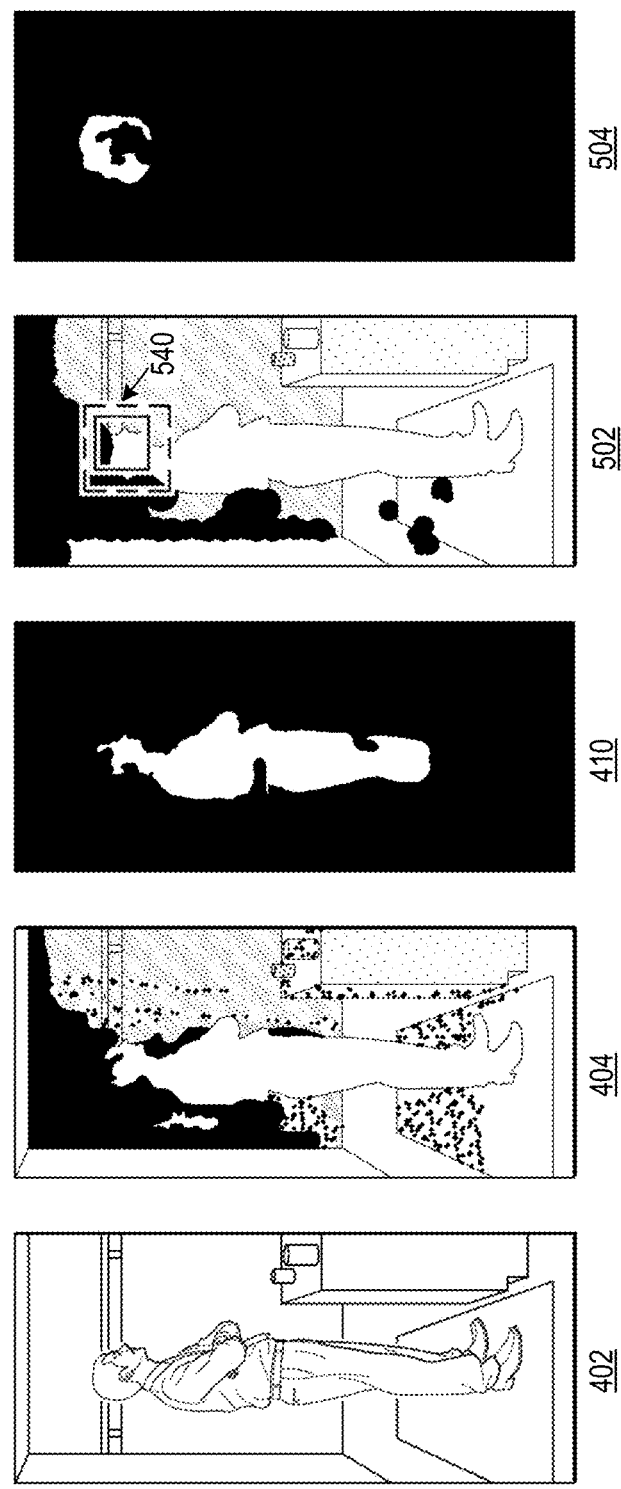
FIG. 5 depicts an RGB image, a first depth image, a second depth image depicting main blob selection, a third depth image depicting face/upper body detection, and a fourth depth image depicting use of a hair prior, in accordance with the various image segmentation techniques described herein.

Depth data generated by depth sensor 146 may be used (along with color data generated by digital camera module 144) to determine the local probability estimates $\Phi_i(x_i,y_i)$ for each pixel. In addition, other local and global cues may be used to define the per-pixel probabilities, to account for short-comings of the depth sensor. For example, hair can be very challenging to detect using depth sensor 146 often resulting in depth holes in the depth image data at positions corresponding to hair. In the processing techniques described below, face detection algorithms that define a human head region of interest (ROI) may be used. For example, image 502 in FIG. 5 depicts an image in which a human head region of interest 540 has been defined. In image 502, the solid box around the face of the human subject may represent the identification of the human face using a facial recognition algorithm. The region of interest 540 may comprise the dashed box depicted in image 502. The region of interest 540 may be a band or portion of image data around the region identified as the human face or head using facial recognition and/or upper torso recognition algorithms. Based on the defined human head, ROI 540, a probability of a pixel to be hair may be determined based on the distance of the pixel from the face. Similarly, depth sensor 146 may fail to generate depth data for pixels representing distant backgrounds and/or sun-lit windows. A background prior process may be used to detect long straight lines in the background 112 of the image data (e.g., in the background of the image) and label such pixels as background. Long straight lines may include a number of pixels disposed in a straight line in the color or depth image data, wherein the number of aligned pixels exceeds a threshold number of pixels (e.g., a length threshold value). In examples where image capture device 116 is kept in one position over a period of time, the background 112 may also be modeled using multiple images captured over time to generate a background model of an environment. The background model may comprise mean and standard deviations of depth values for each pixel, computed over multiple captures for background regions (e.g., pixels encoded with background indicator data over multiple captures/image segmentations). Additionally, the background model may comprise statistics relating to depth hole pixels and/or groups of depth hole pixels (e.g., average color values over multiple captures). For a given image capture, the background model may be used to assign greater background probability (e.g., lower α values as described in further detail below) to pixels with depths within a threshold distance of pixels known to be background pixels from the background model. The background model may be stored in a memory. Subsequent image data captured by image capture device 116 may be compared to the background model and portions of the captured image data may be classified as background based on a correspondence between the portions of the captured image data and image data in the background model. Additionally, movement of the image capture device 116 from one location associated with a background model currently stored in memory to a second, new location may be detected by comparing image capture data to the background model and detecting large scale changes. For example, if less than a threshold number of pixels and/or macroblocks of newly captured image data comprise depth values that do not correspond to the background model, a determination may be made that image capture device 116 has been moved to a new location and that the background model currently stored in memory is not valid for the new location. If such large scale changes indicating movement of the image capture device 116 are detected, the currently stored background model may be deleted from memory and a new background model may be generated from image data captured from the new vantage of the image capture device 116's new location/position. These local and global cues may be used to overcome the limitations of a structured light depth sensor by providing labels for pixels for which no depth data has been generated (e.g., depth holes).

A cascade of classifiers as well as additional local cues may be used to assign probabilities $\Phi(x)$ to each pixel using depth data generated by depth sensor 146 and color data generated by digital camera module 144. These classifiers may be learned using labeled images, where each pixel in the color image is labeled as foreground or background. Since the geometric calibration between the digital camera module 144 and depth sensor 146 is known, the depth image may be mapped to the color image coordinate system. Therefore, the foreground/background labels of the labeled color image may be applied to the corresponding pixels in the depth image.

Advantages to using multiple classifiers as compared to designing a single classifier to classify each pixel may include: (a) classifiers may be relatively simple; (b) classifiers can be trained with less data; and (c) a better tradeoff between false positives and false negatives may be realized using multiple classifiers. By contrast, a single classifier may require a very low false positive and false negative rate, and may therefore require a larger amount of training data.

Classifier Training and Cascade Approach

Notations—

Each capture of image data by image capture device 116 generates a color image I(x), a depth image Z(x), and an infrared image IR(x), where x denotes a pixel. Let $\alpha(x)$ denote the continuous segmentation value for each pixel, with a value of 1 for a foreground label and −1 for a background label. Pixels with no depth information (e.g., pixels for which no depth data is provided by the depth sensor 146, sometimes referred to as "depth holes", have Z(x)=0.

Depth Image Pre-Processing—

The depth image Z(x) may be denoised using a median filter. Small holes (e.g., clusters of pixels with no depth information) may be filled via guided interpolation using the IR image. In some examples, small holes may be selected for filling based on the size of the holes. For example, clusters of depth holes that have no dimensions greater than 15 pixels in length may be considered a small hole and may be filled using guided interpolation techniques described herein. The guided interpolation filling technique may be formulated as a weighted Poisson equation on a 4-connected graph. The weight between two neighboring unknown depth pixels is derived using the difference in the corresponding IR values. This leads to a sparse linear system with known depth values on the boundary of the small holes acting as Dirichlet boundary conditions. In an example, in depth image 406 from FIG. 4B small holes in the depth image 404 after filling small holes using the guided interpolation techniques described above.

Since a human subject (e.g. subject 110 depicted in FIG. 1B) standing on a floor is connected to the floor in the depth data, the floor plane (ground plane) is first removed to segment the subject from the surroundings. The floor plane may be a lower surface of an environment in which the image capture device 116 and/or the subject 110 is located. The image data representing the floor may be removed using a random sample consensus ("RANSAC") method on the depth image to identify the ground plane. The pixels identified as the ground plane (e.g., the floor) may be removed (e.g., deleted) from the depth frame. A connected component analysis may be executed on the remaining depth data to over-segment the depth data into clusters of pixels (sometimes referred to herein as "blobs"). This results in N clusters in the depth frame, wherein each cluster is associated with a respective range of depth values. In depth image 408 of FIG. 4B, pixels with similar depth values have been clustered using a connected component analysis. The various clusters of depth image 408 are depicted with different cross-hatch patterns in FIG. 4B to illustrate that each cluster of the plurality of clusters is associated with a respective range of depth values. Note that depth holes (e.g., pixels with a depth value of 0 such as pixels in region 412 of image 408) form separate blobs and a "hole blob" can span both foreground and background.

Figure 4B:
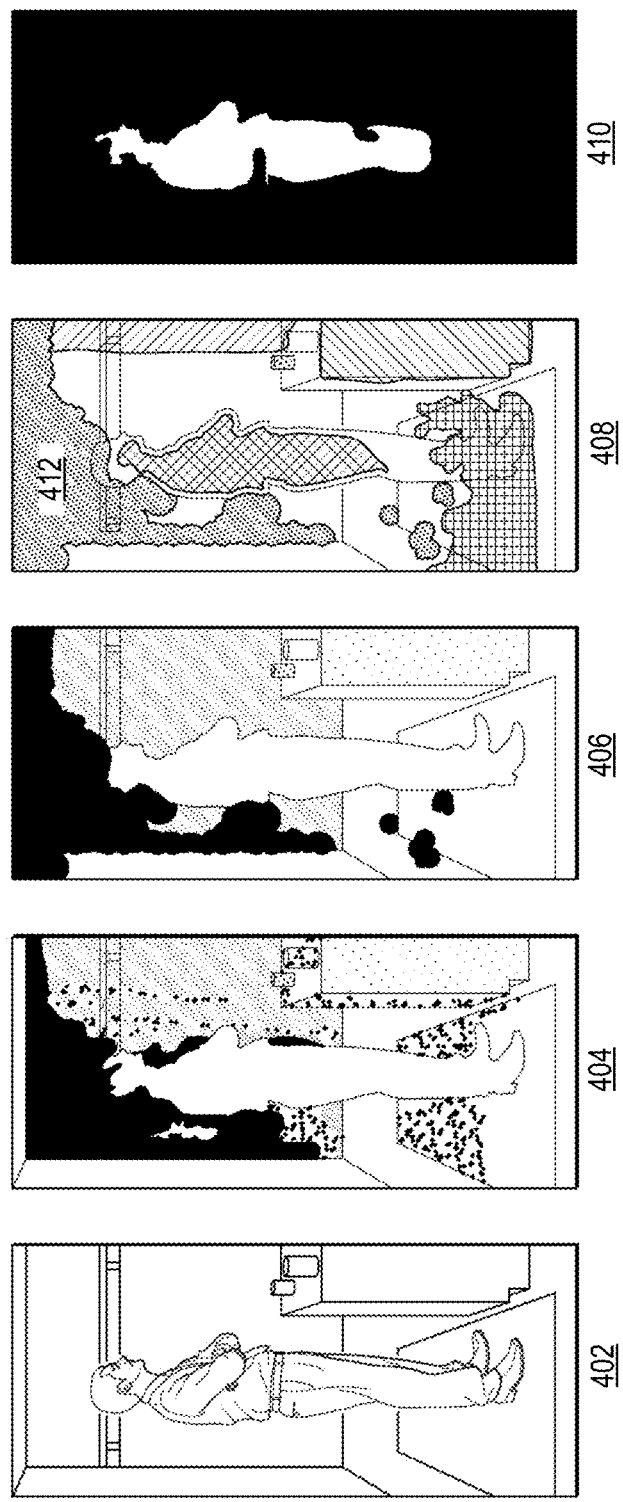
FIG. 4B depicts an RGB image, a first depth image, a second depth image in which small holes are filled using interpolation, a third depth image depicting separation of image data into "blobs", and a fourth depth image depicting main blob selection, in accordance with the various image segmentation techniques described herein.

The over-segmentation technique described above reduces the dimensionality of the problem. For example, for a VGA image, instead of classifying each pixel (307K pixels) as foreground or background, we can classify blobs which typically comprise a few thousand pixels. In various examples, foreground indicator data may be associated with the data representing the main cluster (or "blob") to classify the main cluster (or "blob") as foreground. In FIG. 4B, image 410 represents a binary mask of main blob selection. Pixels of the main blob are labeled as "foreground" by encoding the pixels with foreground indicator data. Foreground pixels are depicted in white in image 410. Similarly, pixels that are not part of the main blob are labeled as "background" by encoding these pixels with background indicator data. Background pixels are depicted in black in image 410. Following main blob selection, the image segmentation techniques may proceed to classification of blobs comprising valid depth data and classification of depth holes (e.g., blobs comprising non-valid depth data).

Main Cluster/Blob Selection

Main blob selection is used to identify and/or determine a single blob or cluster that corresponds to the human subject or other object of interest. Pixels of the main blob are labeled as foreground. As used herein, labeling one or more pixels as foreground or background may include encoding the image data (e.g., the pixel, blob, cluster, frame, etc.) with foreground or background indicator data. Foreground and/or background indicator data may comprise a number of bits that may indicate whether the particular image data is classified as foreground or background. Note that the subject may be disconnected into multiple blobs due to the over-segmentation techniques described above. In at least some examples, one or more of the various techniques for main blob selection described below may be used in order to identify the main blob. Although all of the techniques described below may be used in conjunction to identify the main blob, in some examples, a subset of the various techniques described below may be used for main blob identification, depending on the desired implementation.

Any suitable face detection and upper body human detection algorithm may be employed in the RGB image to restrict the region of interest (ROI) to search for the main foreground blob in the depth image (e.g., the main foreground blob comprising image data representing a human face or upper human torso, as identified by the face detection and/or upper body human detection algorithms). The depth image may be mapped to the color image such that a pixel of the depth image is associated with one or more pixels in the color image (depending on the resolution). A region in the color image data identified as including a human face using a facial recognition algorithm may correspond to an associated region in the depth image. The cluster including the human face region in the depth image may be a candidate blob for the main foreground blob. Blobs with a size (e.g., blob dimensions and/or area) less than a lower size threshold, blobs with a size (e.g., blob dimensions and/or area) greater than an upper size threshold, and obvious background blobs may be removed by being labeled as "background". Obvious background blobs may be identified based on the average depth value of the blob exceeding a high distance threshold. In some examples, the high distance threshold may relate to a typical distance between a lens of image capture device 116 and a subject (e.g., subject 110 depicted in FIG. 1B). Similarly, in at least some examples, blobs with average depth values that are below a low distance threshold (e.g., blobs representing objects that are too close to the depth sensor) may be excluded from a set of candidate main blobs. In some examples, subjects may often be positioned within a certain distance of image capture device 116. For example, subjects may be positioned within about 2 meters of image capture device 116. In some other examples, subjects may be positioned within about 2.5 meters from image capture device 116. These distances are provided as examples only, and any desired distance may be used in accordance with the techniques described herein. In various other examples, image capture device 116 may utilize a long focal length camera, and, accordingly, the subject may be positioned further from the image capture device 116 than would typically be the case when using a shorter focal length camera. Blobs may be identified as "obvious background blobs" when the average depth value of pixels of the blob far exceeds the average distance of the subject in a particular configuration of image capture device 116. In some examples, blobs with average depth values that are more than 2.5 m, 3.0 m, 3.3 m, 2.1 m, 1.8 m, or another desired distance, may be identified as obvious background blobs depending on the particular configuration of image capture device 116. In some other examples, blobs with average depth values that are more than 2×, 1.5×, 3×, 4×, 3.1×, etc., the average distance between the subject and the image capture device 116 may be identified as obvious background blobs, depending on the particular configuration of image capture device 116. After removal of too-small, too-large, and obvious background blobs, the number of remaining candidate blobs/objects/clusters for selection as the main blob are considerably reduced. For example, after removal of the non-candidate blobs described above (e.g., too-small, too-large, and obvious background blobs), fewer than 10 candidate blobs may remain for selection of the target main blob representing the subject. In some examples, image capture device 116 may select the blob or cluster with the lowest average depth value (e.g., the closest blob) from among the candidate blobs as the main blob.

Additionally, a comprehensive distance D may be calculated for each blob. The blob with the lowest comprehensive distance D may be selected as the main blob. In various examples, D may be calculated only for candidate blobs that satisfy the size and central location requirements described above in order to reduce latency and computational complexity. The comprehensive distance D may be given by the heuristic formula: $D = r_x * r_y * r_z * r_{size}$ where:

$$r_x = 1 + \frac{(x_{blobcentercoordinate} - x_{windowcentercoordinate})}{width_{central\ window}};$$

$$r_y = 1 + \frac{(weight_{y_{offset}})(y_{blobcentercoordinate} - y_{windowcentercoordinate})}{height_{central\ window}};$$

$r_z = |(\text{blob distance to camera}) - (\text{min distance to camera})|$; and $$r_{size} = 1 + \frac{(weight_{size})(\text{min blob size})}{\text{blob size}}.$$

The equations given above for calculating the comprehensive distance D models how a blob is located with respect to the central window, how close the blob is to the image capture device 116 and how large the blob is relative to a minimum object of interest size. The $weight_{y_{offset}}$ and weight$_{size}$ may be empirically determined. The blob with the smallest comprehensive distance D may be selected as the main blob.

Intuitively, it may be desirable to select the blob as the target object or "main blob" that includes one or more desired characteristics. For example, desired characteristics of the target object or main blob may include the blob which is largest in size, closest to the image capture device 116, located in a near central point in the image frame, not entirely disposed close to the ground (as the subject is unlikely to be entirely close to the ground), etc. As such, intrinsic features may be developed for selecting the main blob based on these desired characteristics.

Training data may be used to derive shape features (e.g., Hu moments, central moments) for positive and negative user/subject blobs. Derived shape features may be stored in a database in memory 150. During the main blob selection, K nearest neighbors within the feature database are found for each blob. The average distance between each blob and the shape feature is computed in the feature space. A cost function combining the distance of shape features and weighted intrinsic features is generated. The cost function is used to determine the blob that has the minimum cost. Weights in the feature space may be tuned using available training data.

Advantageously, since only one main blob is selected at this stage of processing, a classifier to classify all blobs (requiring high recall and high precision) need not be used. However, the above techniques may still provide highly accurate main blob selection. In some examples, the failure rate for main blob selection in accordance with the above techniques may be less than 1% on a dataset of 8000 images (99% accuracy). Note that due to the cascade approach of image segmentation described in the present disclosure, if the main blob is mis-detected, the error is irrecoverable and the segmentation process will need to be re-executed. Accordingly, a very high accuracy is needed during main blob selection.

Pixels of the selected main blob are labeled as "foreground". In various examples, no later inference may be run for the pixels within the selected main blob, significantly reducing the number of unknowns in the final inference. The depth image data may be mapped to the color image data, as previously described. Accordingly, pixels of the color image that are associated with the pixels of the main blob in the depth image may effectively be labeled as "foreground." Similarly, pixels in the color image that are associated with background pixels in the depth image may effectively be labeled as "background."

Conditional Classification of Valid Depth Blobs

In the following examples, B$_m$ denotes the selected main blob. A classifier may be trained to classify remaining depth blobs as "foreground" or "background". The classification may be conditioned on the selected main blob B$_m$. As used herein "valid depth blobs", refers to blobs that are not depth holes and thus have valid depth values. Processor 148 may be effective to find P(B/B$_m$) for each valid depth blob B. All pixels x in B may be assigned the same probability.

For each blob B, several intrinsic features may be defined by processor 148 using the depth data of the blob. Additionally, relative features of each blob B may be identified with respect to the main blob to determine a relative similarity (or relative lack of similarity) between the blob being evaluated and the main blob. Intrinsic features may comprise average 3D position, standard deviation in x, y, z directions, distance from ground plane, blob size, average depth of blob in millimeters, average spatial distance of pixels in a particular blob from main blob (in terms of a number of pixels), distance from main blob in millimeters, percentage overlap with a facial region or other region of interest, spatial location of blob center with respect to main blob center, spatial location of blob center with respect to top (or other point) on main blob, etc. The previous list of features is non-exhaustive and other features may be defined in order to classify blobs as foreground or background conditioned on the main blob. Relative features may comprise average depth difference between a selected blob B with respect to the main blob, spatial location with respect to main blob, etc. In an example, an average three-dimensional position of pixels of a selected blob B may be compared to an average three-dimensional position of pixels of the main blob. If the average three-dimensional position of pixels of the selected blob B corresponds to the average three-dimensional position of pixels of the main blob within a specified threshold tolerance (e.g., 10%, 12%, 5%, etc.), a probability that the blob B corresponds to foreground data may be increased. Similarly, if the average three-dimensional position of pixels of the selected blob B corresponds more closely to the average three-dimensional position of pixels of the main blob relative to other blobs, a probability that the blob B corresponds to foreground data may be increased. In general, for relative features, a level of correspondence between the feature of a selected blob and the same feature in the main blob may be determined. The a probability that pixels of the selected blob are classified as foreground or background depends on the level of correspondence between the feature value for the selected blob and the feature value of the main blob. In various examples, lookup tables may be used to associate various degrees of correspondence with increases or decreases in a probability values. As described in further detail below, a probability values may be used to classify pixels and/or groups of pixels as foreground or background.

Training data may be used to train a random forest-based classifier using 32 trees. Training data may comprise positive and negative samples. In various examples, ≥20,000 positive samples and ≥80,000 negative samples may be used. The preceding example represents one possible set of training data. Any size of training data may be used in accordance with the image segmentation techniques described herein. The classifier may be used to generate a probability estimate for each blob of between 0 and 1, by averaging predictions for all trees. In the classification examples provided above, relatively simple features (e.g., in terms of data size) may be selected depending on the processing power of processor 148 and available memory 150 of image capture device 116. In various examples, low-complexity features may be selected in order to reduce latency and improve classification speed during run time relative to CNN-based approaches In various examples, the segmentation label (e.g., "foreground" or "background") of blobs with a probability estimate near 1 (e.g., ≥0.8, 0.75, 0.83, 0.8667, etc.) may be classified as "foreground" (e.g., encoded with foreground indicator data). Similarly, the segmentation label of blobs with a probability estimate close to 0 (e.g., ≤0.1, 0.2, 0.3, 0.23, 0.167, etc.) may be classified as "background" (e.g., encoded with background indicator data). In various examples, no later inference may be computed for pixels of these labeled blobs. Labeling blobs in accordance with probability values, as described above, may reduce the computational complexity of the image segmentation by reducing the data set for inference computation.

Conditional Classification of Holes

As previously noted, depth holes may span both background and foreground. For example, hair of human subjects may result in depth holes in the depth image. Dark background proximate to dark hair in image data (e.g., depth image data) can result in a depth holes comprising regions of hair that ideally should be labeled as "foreground" as well as "background" regions visible through and around the hair. Accordingly, classification of a depth hole blob as foreground or background is not possible, as depth holes may comprise both background and foreground.

To account for this, each depth hole may be divided into non-overlapping blocks of 32×32 pixels. Each block may be classified separately, again conditioned on the main blob to determine degrees of correspondence between the block (or other portion of pixels) and the main blob. In various examples, lookup tables may be used to associate various degrees of correspondence with increases or decreases in a probability values. As described in further detail below, a probability values may be used to classify pixels and/or groups of pixels as foreground or background. Processor 148 may define features for each depth hole. Examples of depth hole features may comprise spatial location of a depth hole with respect to main blob, location of the depth hole with respect to a detected face or facial region (e.g., detected using a facial recognition algorithm), average color within the block using the color image, etc. Additionally, an integral image may be used to compute the amount of foreground (given by main blob) in all 8 directions of a given block. For example, a 32×32 block of pixels representing hair may have large amount of foreground below the block, but negligible amount above the block. As such, computation of the amount of foreground in the 8 directions surrounding the block using the integral image may provide an effective localization feature for identification of hair. The features described above may be scaled using the average depth value of the main blob to make the features invariant to user distance. A separate random forest based classifier may be used for classifying depth holes. The features selected for classification may vary in different implementations. In the classification examples provided above, relatively simple features (e.g., in terms of data size) may be selected depending on the processing power of processor 148 and available memory 150 of image capture device 116. In various examples, low-complexity features may be selected in order to reduce latency and improve classification speed during run time relative to CNN-based approaches.

Local Probabilities

Processor 148 may compute the probability (data cost) $\Phi_{RGBD}(x)$ for each pixel x using the classifiers discussed above. Segmentation approaches which are only image based typically use learned or pre-defined filters using, e.g., histogram of orientated gradients (HOG) descriptors, and train to select the best set of features. CNN based approaches learn the filters in a supervised manner via backpropagation. The learned filters are then used to define the data cost of each pixel at run-time. However, using depth data may provide advantages in terms of computational complexity and accuracy when determining the probabilities (data cost) of pixels x.

Other Local Cues

Face detection and upper human body detection algorithms, known to those skilled in the art may be used and combined with depth data to provide additional local cues. Within a detected face region, for each pixel x, we define a probability based on the difference between the depth value of the pixel and the average depth value of the main blob.

Pixels with very high probabilities (e.g., ≥0.75, 0.8, 0.77, 0.65, 0.9, etc.) may be labeled as foreground.

Hair Prior Segmentation

As discussed, segmentation of hair often poses a challenge for 3D sensors as depth holes are common in regions of image data representing hair. A hair prior segmentation may be used to classify depth holes near the facial region of the subject in the color image based on the distance of such pixels from known foreground pixels. The hair prior segmentation may be performed according to the techniques described herein as:

$$P_{hair}(x) = \exp\left(\frac{-d_{fg}(x)^2}{\sigma^2}\right) \quad (2)$$

where x is a pixel within the face/head ROI, $d_{fg}(x)$ is an input parameter to the $P_{hair}(x)$ equation and represents the distance (in terms of a number of pixels) to the nearest known foreground pixel and σ is a weight parameter influencing the fall off (a "fall off parameter"). The distance may be calculated using a fast distance transform. Note that in some examples, the hair prior may only be applied on face/head ROI, which may be defined using the face/upper human body detection algorithms. In examples where face or upper human body detection fails, a head ROI is defined using the top of known foreground (e.g., the top 15%, top 20%, etc. of the known foreground pixels of the main blob). In various examples, the hair prior may only be defined for pixels with no depth values (e.g., depth values equaling zero). Pixels having valid depth values are classified in previous stages (e.g., see Conditional Classification of Valid Depth Blobs, above). Image 504 in FIG. 5 depicts an example image after use of the hair prior described above.

Background Environment Prior

In various examples, image capture device 116 may be used indoors in a home environment. Further, image capture device 116 may be placed in a desired location by a user (e.g., in a user's home, business, or other location) and may build a background model based on that location. In some examples, depth sensor 146 may have difficulty generating valid depth data for far away backgrounds (e.g., beyond 3.5 m, 4 m, 5 m, etc. depending on the particular depth sensor used) and for areas with strong sunlight. Indoor, man-made environments are often characterized by straight lines in the scene (e.g., walls, doorways, ceilings, floors, counters, tables, surfaces, etc.). This fact can be leveraged using a background prior to detect long straight lines in the color image data and label pixels representing such lines as background. Since long, straight lines can also occur in image data on a human subject, the background detection prior may be conditioned on the main blob selection. Accordingly, long straight lines close to the main blob may be ignored (e.g., within k pixels of the main blob, where k is an adjustable design parameter). Let L(x) denote the pixels x corresponding to long straight lines in the scene.

$$P_{BGLines}(x)=0\, d_{fg}(X)>\alpha,\, x\in L(x) \quad (3)$$

where $d_{fg}(x)$ is the distance from the known foreground (e.g., the main blob). Note that the background environment prior is only defined for pixels lying on detected lines.

Additional Depth Prior

The conditional classification of valid depth blobs described above is blob-based and all pixels in the blob are classified with the same value. In addition to such blob-based classification, actual depth values of pixels may be used to handle errors in classification and to have a more continuous prior. In such an additional depth prior, µ may be the mean depth of the main blob, and Z(x) may be the depth of a particular pixel x. The additional depth prior may be defined as:

$$P_{Depth}(x) = \frac{f(x)}{f(x) + b(x)} \quad (4)$$

where f(x) is the probability of being close to mean foreground depth and b(x) is the probability of being close to background. f(x) and b(x) are defined as:

$$f(x) = \exp\left(-\frac{(z(x) - \mu)^2}{\sigma_2^2}\right)$$

$$b(x) = \max\left(\exp\left(-\frac{(\mu + t - z(x))^2}{\sigma_2^2}\right), \exp\left(-\frac{(\mu - t - z(x))^2}{\sigma_2^2}\right)\right)$$

where t is an offset in mm. Accordingly processor 148 of image capture device 116 may determine whether the pixel depth Z(x) is close to mean depth µ or away from mean depth µ based on $\sigma_2$·µ+t may be used to represent far backgrounds and µ−t may be used to represent closer depths away from mean depth. The maximum over (µ+t) and (µ−t) may be determined for computing b(x). For humans, considering span of humans in depth, reasonable values may be t=800 mm and $\sigma_2$=600 mm, although different values may be used.

In summary, local probabilities of pixels may be obtained using learned classifiers $P_{RGBD}(x)$, hair prior $P_{hair}(x)$, background prior $P_{BGLines}(x)$ and depth prior $P_{Depth}(x)$, $\lambda_1$, $\lambda_2$, $\lambda_3$ and $\lambda_4$ may be defined as the weights of $P_{RGBD}(x)$, $P_{hair}(x)$, $P_{BGLines}(x)$, and $P_{Depth}(X)$. In various examples, weights $\lambda_1$, $\lambda_2$, $\lambda_3$ and $\lambda_4$ may be learned and tuned using training data.

Graph Structure

After obtaining foreground/background probabilities for each pixel, the probabilities may be refined using a non-local neighborhood. A graphical model for segmentation may define virtual nodes for foreground and background, respectively. Each pixel is connected to the virtual nodes $\Omega_F$ and $\Omega_B$ based on the pixel's local probability, as previously defined (e.g., $\Phi_{RGBD}(x)$). Each pixel's neighborhood includes K feature-space neighbors, which may be non-local. A non-local neighborhood may be defined using K-nearest neighbors (KNN) for each pixel, as described below.

K-Nearest Neighbors

To define the non-local neighborhood for each pixel, the K-nearest neighbors are found in a feature space. The segmentation is performed on super-pixels (sp) of size S×S, rather than for each pixel to reduce computation cost. For each super-pixel, an 8-dimensional feature vector may be defined based on the super-pixel's average color value for each channel of the color space (e.g., $\mu_L$, $\mu_A$, $\mu_B$ in the LAB color space), the standard deviation of color values in each color channel (e.g., $\sigma_L$, $\sigma_A$, $\sigma_B$ in the LAB color space), and the centroid of each super-pixel as the super-pixel's spatial location (e.g., (β×x, β×y)). Accordingly, an example 8-dimensional feature vector may be f(sp$_i$)=µ$_B$, $\sigma_L$, $\sigma_A$, $\sigma_B$, β×x, β×y). The spatial features are weighted by β to define the influence of the non-local neighborhood. If β=0, the entire image is used for search for neighbors. Similarly, increasing the weight β reduces the search neighborhood. The weight between super-pixels sp$_i$ and sp$_j$ is computed as:

$$W_{KNN}(i, j) = 1 - \frac{\|f(i) - f(j)\|}{K} \quad (5)$$

where ∥ ∥ denotes the norm of the vector and K is a constant.

Inference

Processor 148 may use a quadratic cost function for inference to infer the segmentation value α(x) for each pixel x.

$$C(x,\alpha) = \Sigma W_{fg}(x)(\alpha(x)-1)^2 + W_{bg}(x)(\alpha(x)+1)^2 + \Sigma W_{KNN}(\alpha(x)-\alpha(u))^2.$$

$$x=1 u \varepsilon N,$$

$W_{fg}(x)$ represents the combined foreground prior at pixel x, $W_{bg}(x)$ is the combined background prior at pixel x, and $N_x$ denotes the non-local neighborhood of pixel x.

The foreground prior $W_{fg}(x)$ is the weighted combination (using $\lambda_1$, $\lambda_2$, $\lambda_3$ and $\lambda_4$) of learned local priors $P_{RGBD}(x)$, hair prior $P_{hair}(x)$ and depth prior $P_{Depth}(x)$. Similarly, the combined background prior is the weighted combination of background environment cues prior $P_{BGLines}(x)$ and inverse (one minus) of local and depth priors.

Solver

Processor 148 may calculate the derivative of the cost function C(x,α) for each pixel to generate a linear system of equations. If the neighborhood size is K, the linear system may be sparse as each pixel interacts with K pixels. Processor 148 may solve the sparse system using standard linear system libraries. For example, the sparse solver (LDLT) in the EIGEN C++ library may be used by processor 148 to solve the system.

In various examples, the linear system may be simplified in order to avoid solving for each pixel and/or for each super-pixel. For example, processor 148 may solve the linear system only for those pixels that are not classified as foreground or background in previous processing stages. For example, all pixels of the main blob have been previously classified as foreground. Pixels with very high confidence from classifiers can be set to foreground/background. For example, pixels with α(x)≥0.8 may be classified as foreground (e.g., encoded with foreground indicator data) and pixels with α(x)≤0.2 may be classified as background (e.g., encoded with background indicator data). Processor 148 may be programmed to remove such pixels from the system in accordance with the techniques described below.

Given a final linear system over all pixels may be Ax=b. x may be written as:

$$x = \begin{bmatrix} x_{known} \\ x_{unknown} \end{bmatrix}$$

where $x_{known}$ denotes known pixels and $x_{unknown}$ denotes unknown pixels. Accordingly, $$\begin{bmatrix} A_{11} & A_{12} \\ A_{21} & A_{22} \end{bmatrix} \begin{bmatrix} x_{known} \\ x_{unknown} \end{bmatrix} = \begin{bmatrix} b_{known} \\ b_{unknown} \end{bmatrix}$$

Processor 148 may determine the unknown values by removing the contribution of known pixels from the system:

$$A_{22 \times unknown} = b_{unknown} - A_{21 \times known}$$

In an example, a 5 MP RGB image may comprise from a few thousand to 30,000 unknowns.

Multi-Resolution Processing

To reduce the latency of the solver, multi-resolution processing may be employed. The system may initially be solved at a coarse resolution (e.g., using larger super-pixels). Subsequently, the solution from the coarse resolution solver may be used as an initial guess for finer resolutions. For example, an initial super-pixel size of 16×16 pixels may be used to generate a coarse solution. The solution from the course resolution may be refined at a 4×4 super-pixel size. An adaptive super-pixel size may be used to ensure that the number of unknowns remains below a predetermined level (e.g., 15,000).

Processor 148 may employ border matting and/or border smoothing to refine the borders of the final segmentation. For example, Gaussian filtering and/or interpolation may be used to smooth the edges of the segmented subject. In various examples, a Gaussian filter may use a Gaussian function to calculate the transformation to a apply to each pixel to be blurred. The Gaussian blur may reduce the visual clarity of high frequency components of pixel values and may result in borders that appear more smooth to a human viewer.

Rendering of Output Image

In some examples, a small area surrounding the feet of a subject may be assigned as foreground to avoid segmenting out (e.g., labeling as background) the feet of the subject. For example, two-dimensional image data of the subject's feet may be identified in the RGB image data and may be projected onto the ground plane to avoid cutting off the subject's feet in the segmented image data (e.g., the image data encoded as foreground after segmentation). The small projected area may sometimes be referred to herein as a "floor spot." In some examples, RANSAC may be used to identify a set of pixels of the depth image data corresponding to a floor in the depth image data. Color image data corresponding to the foreground image data of the main blob may be projected onto the identified floor image data. In some examples, a threshold percentage of the color image data may be projected (e.g., the lower 20% of the color image data corresponding to the main blob may be projected onto the floor). Otherwise, the feet may be cut out of the segmented image as the depth values of the subject's feet may differ significantly from the remainder of the subject's body (at least for a standing human subject). Additionally, a small quadrilateral or other-shaped region of RGB image data surrounding the subject's feet may be assigned as foreground to avoid giving the impression of a "floating" subject in the segmented image. Further, in some examples, the background may be blurred to generate the final visual output shown to the user on a display, instead of showing the segmentation on a white background. Blurring the background may result in a visually pleasing image and may bring focus and attention to the subject (e.g., the user and/or clothing items), while reducing visual attention on background clutter.

Semantic Depth of Field

Depth of field effect, also known as "bokeh," is an artistic effect where the visual attention of a viewer of image data is drawn to a subject in the scene by keeping the subject in focus and blurring the rest of the image. High quality SLR cameras and fast lenses with large aperture can optically achieve this effect, without any manual or software post-processing. The depth of field is inversely proportional to the aperture size of the lens. For example, the larger the aperture, the smaller the scene depth range which remains in sharp focus in the image. Professional photographers often use large aperture lens to keep the subject in focus and optically blur the rest of the background.

Typical smart-phone cameras have small aperture sizes and focal length due to cost and form-factor requirements of camera modules. Currently, large and long lenses are not included in smart phones due to size constraints. Accordingly, smart-phone camera images typically exhibit large depth of field, where often the entire image is in focus. In some recent examples, applications (e.g., smartphone "apps") have been released on various smartphone platforms to achieve synthetic depth of field effects. For example, some camera apps feature a "lens blur" mode that asks user to move the smart-phone while capturing multiple images. The processor of the phone estimates scene depths based on the movement and positional sensors within the phone and then blurs the image based on the estimated depth values. In some examples, controls may be provided to change the amount of blur as well as to select which depth regions to keep in focus. In some other examples, smart phones may employ a stereo camera in a "portrait mode." In "portrait mode", the stereo camera may be used to estimate scene depths and blur the background.

In the approaches described above, since depth of field effect is based on estimated depths, objects at the same depth will have the same level of focus/blurriness. For example, if a human subject is standing next to furniture or a wall, the above techniques may keep both the subject and the surrounding areas at the same depth sharp, while blurring the background. Additionally, if a subject is spanning a large depth range, parts of the subject may be blurred. For example, if a human subject is holding out their arm toward the camera, portions of the user's arm may be blurred when using estimated depth values to generate synthetic depth of field effects using the techniques described above. Accordingly, the depth of field effect is based on synthetic depth data and not on a semantic understanding of the image data representing the captured scene.

Using the image segmentation techniques described above to segment an object of interest (e.g., a human subject) from background data, a semantic depth of field effect may be achieved by blurring only those pixels that do not correspond to the object of interest. Additionally, objects in the scene that are at the same depth as the object of interest may be blurred out while the object of interest may be kept in sharp focus. The techniques described below for semantic depth of field effect generation may generate a layer-based depth of field effect based on a noisy/incomplete depth map of the scene (e.g., a depth map with a large number of depth holes).

Simplified Approach to Semantic Depth of Field Effects

One approach to rendering a semantic depth of field effect is to blur the background obtained from the segmentation image (e.g., segmentation image 414) and keep the foreground sharp. In the equation below, M denotes the binary segmentation mask, where the value of M is "1" for foreground pixels and "0" for background pixels in the segmentation mask. For example, segmentation image 414 is a binary mask where foreground pixels are displayed as white and background pixels are displayed as black. $I_o$ represents the original image. The original image may be blurred using a Gaussian or Disk filter to obtain a blurred image $I_b$. The final image R may be rendered as:

$$R = M.*I_0 + (1-M).*I_b$$

In the equations described herein, ".*" denotes a pixel-wise multiplication. Additionally, for single pixel value calculation, the equations described herein may replace ".*" with "*" to indicate that the calculation is performed for a single pixel value instead of using the ".*" pixel-wise multiplication. R is generated using the foreground region from the original image data and the background region from the blurred image $I_b$. Although the simplified approach above results in a sharp foreground and a blurred background, blurring the original image data to generate $I_b$ may result in halo-artifacts (e.g., lighter rings and/or outlines around objects in the blurred image data) due to the combination of foreground and background colors combined near the segmentation boundary in the image R.

Additionally, the segmentation image 414 usually includes some errors with some pixels that relate to foreground image data being classified as background (a condition sometimes referred to as "erosion") and some pixels that relate to background image data being classified as foreground (a condition sometimes referred to as "dilation") resulting in obvious visual artifacts in the final rendered output. Using the simplified approach above to generate semantic depth of field effects may result in an image where the foreground image data appears to have been cut and pasted onto a blurred background. Accordingly, the techniques described below allow the in-focus foreground image data to be smoothly blended into the blurred background.

Reducing Halo Artifacts

Halo artifacts can occur when there is a well-defined contrast between foreground image data and background image data at the segmentation boundary 107 (FIG. 1A). Blurring the original image data to obtain $I_b$ results in mixing of foreground and background colors close to the segmentation boundary, resulting in halos. Halos result from the mixing of background image data values (e.g., chroma, luma) with foreground image data values during the blur operation, since no occlusion information between foreground and background is considered. For example, if the subject of an image has dark hair and the background is a white color, a continuous band of dark to white will appear in $I_b$ close to the segmentation boundary. By contrast, the desired output is dark hair, with a sharp cut-off to the blurred bright background. In SLR cameras, halo artifacts are automatically avoided, because the occlusion between foreground and background optically prevents the mixing of foreground and background colors.

To avoid halo artifacts, a bilateral filter is guided by the segmentation boundary in segmentation image 414 to blur pixels corresponding to the background in the RGB image 402. The bilateral filter avoids the mixing of foreground and background colors, by only mixing the background colors within the blur filter's spatial extend region. The blur filter's spatial extend region may be a region in which the blurring operation of the blur filter occurs and may vary according to the design of the particular filter. The bilateral filter may be implemented by generating a mask layer binary image in which the pixels of the segmented image labeled as foreground are excluded or "masked out" by giving these pixels a value of "0." Similarly, pixels of the segmented image labeled as background (e.g., encoded with background indicator data) are unmasked (e.g., given values of "1"). The unmasked image data in the segmentation mask is blurred using the blur filter and the filtered values are normalized.

Multi-Layer Blending

Various portions of the following description reference portions of FIG. 1A. In order to reduce the visually unappealing "cut-and-paste" effect of simply blurring background image data while keeping foreground image data in focus, using the simplified approach described above, a multi-layer approach for depth of field effect, where blur is gradually increased away from the segmentation boundary, is described below. The simplified approach described above can be conceptually considered as a "two layer approach", with a foreground layer and a background layer. If the final segmentation image does not include errors, the transition between foreground and background occurs precisely on the segmentation boundary 107, giving a visually pleasing rendering. However, due to segmentation errors (e.g., erosion and/or dilation), the foreground-background transition may not occur on the actual user boundary and visual artifacts may result. Using a multi-layer approach, additional layers are included to smooth out the transition from sharply focused foreground image data to blurry background image data.

According to an example technique for multi-layer blending of foreground and background image data, N layers may be defined, with each layer comprising an associated transition width ($w_i$) and a blur value $b_i$, as depicted in FIG. 1A. As previously described, a blur value $b_i$ may represent the σ value of a low pass filter (e.g., a Gaussian filter) used to generate a weighted average of a contiguous neighborhood of pixels and apply that weighted average as the new value for a pixel being blurred using the low pass filter. In general, the larger the blur value $b_i$, the larger the neighborhood of pixels and more the pixels will be blurred using the particular filter. In general, a low pass filter used to blur pixels may be effective to reduce the high frequency components of pixels by generating a weighted average of the contiguous neighborhood of pixels, as specified by the σ value of the low pass filter.

$b_N$ denotes the blur value for the last layer (e.g., the background layer furthest away from the subject or other object of interest). In at least some examples, the last layer blur value $b_N$ may be adjustable by a user of image capture device 116 through a user interface (e.g., on a companion application associated with image capture device 116). The transition width $w_i$ may be defined as the distance, in terms of a number of pixels, from the segmentation boundary until a position at which the layer is effective. As shown in FIG. 1A, the transition width $w_0=0$, which corresponds to the width of the segmentation boundary. One example algorithm using the layer transition widths $w_i$ and per-layer blur values $b_i$ to render an output image with multi-layer blending is provided below:

$D_{seg}$ may be the distance transform of the segmentation mask M. For each pixel, $D_{seg}$ denotes the distance to the nearest foreground pixel in the segmentation mask M.

1. Start with the base layer and set $I_k = I_o$ as the original image
2. For each layer
   a. Blur $I_k$ using current layer blur value $b_i$ to obtain $I_b$.
   b. Compute blend strength $F_k = a.*D_{seg} + b$ (where a and b are constants), such that $F_k$ transitions from 1 to 0 within the current layer. $F(w_0)=1$; $F(w_k)=0$; a and b are constants;
   c. Compose the blurred image and previous layer image $I_k = I_{k-1}.*F_k + I_b.*(1-F_k)$
3. Repeat until last layer and obtain $R = I_N$.

Accordingly, each of the layers (e.g., layers 103, 105, 106 in FIG. 1A) is blended together with the previous layer and the blend strength of the layer is adjusted within each layer to prevent sharp transitions in the amount of blur between any two layers. Blend strength $F_k$ is 1 at the beginning of a layer and is 0 at the start of the next layer when traversing the layers in FIG. 1A from the segmentation boundary 107 outwards. A disc blur and/or Gaussian filter may be used to blur the pixels values according to the blur value $b_i$. Various other multi-layer blending algorithms may be used in accordance with the present disclosure. For example, non-linear methods may be used to compute blending strength. Additionally, different equations may be used to blend various blurred layers together. Furthermore, any number of layers may be used in accordance with the multi-layer blending techniques described herein.

In addition to the multi-layer blending described above, the boundary of the foreground image data (e.g., the image data encoded with foreground indicator data) may be blurred with a small-sized (e.g., a σ value of 1, 2, 3, etc.) median filter before composing the foreground image data with the multi-layer blended background image data. A small-sized median filter may act as a directional filter that may maintain boundary edges at the segmentation boundary 107 while suppressing noise, leading to improved blending between foreground image data and background image data and reducing visible artifacts due to image segmentation errors.

Assigning Confidence Values to Segmentation to Improve Visual Quality

While the multi-layer blending techniques described above can handle small localized segmentation errors across the boundaries, often segmentation can result in large errors. Large segmentation errors often occur when the depth image is of poor quality (e.g. where the depth image has a large occurrence of depth holes). As described below, the location of depth holes, as well as depth values close to the depth holes may be used to modulate the blending function F in the multi-layer blending algorithm described above. The location of depth holes and depth values for pixels of the color image data may be encoded in the segmentation mask. Accordingly, a computing device performing the various blurring and other image processing techniques described herein may receive the segmentation mask and the color image data as an input and may perform the various techniques described herein using the segmentation mask and the color image data.

A confidence value may be assigned for each pixel in the segmentation output (e.g., in segmentation image 414) to indicate a degree of confidence that the segmentation for that pixel is correct. If there is a large occurrence of depth holes in a particular region of pixels (e.g., above a threshold percentage of the pixels in the depth image), as known from the depth data in the segmentation mask, it may be concluded that the excessive number of depth holes makes it more likely that a segmentation error may occur and therefore a confidence value may be reduced for pixels close to the depth holes (e.g., within a threshold depth hole distance). The confidence value can be used to modulate the blending functions. Erosion errors in which foreground pixels are classified as background image data may result in less visually appealing images relative to dilation errors. Accordingly, blur may be reduced for pixels corresponding with depth holes that are spatially close to segmentation boundary since these pixels may comprise foreground image data corresponding to the human subject or other object of interest.

The following is an example technique for reducing blur for depth hole pixels that are close to (e.g., within a threshold distance of) the segmentation boundary. $M_{holes}$ may represent a binary map of depth data indicating 1 for pixels which are depth holes (e.g. pixels that do not include valid depth data) and 0 otherwise. The distance transform $D_{holes}$ may be computed for this binary map. $D_{holes}$ assigns the distance to the nearest hole to each pixel in $M_{holes}$. A width value $w_{holes}$ may be assigned to pixels which are depth holes. The width value $w_{holes}$ may represent a distance from the hole-pixels to the segmentation boundary and may be used to modulate the blending functions. Holes close to the segmentation boundary are more likely to include image data representing the object of interest, while holes farther away from segmentation boundary can have large amount of blur as these holes are less likely to represent the object of interest. The hole-blending function $F_{holes}$ may be computed as: $F_{holes}=$ $(k1*D_{holes}+k2).*(k3*D_{seg}+k4)$, where k1 and k2 are constants to transform $D_{holes}$ to 1 at holes and 0 away from holes. Similarly, k3 and k4 are constants to transform $D_{holes}$ to 1 close to the segmentation boundary and 0 at $w_{holes}$. Essentially, $F_{holes}$ is high for those pixels which are close to the segmentation boundary and close to the holes in the depth map. $F_{holes}$ may be used to modulate the blending function F of each layer (increase the blending value), so that the blur on holes close to the segmentation boundary is reduced. In other words, blur is increased on pixels close to the segmentation boundary which are not holes in the depth map.

Handling Erosion Errors Using Actual Depth Values

In some cases, segmentation errors may also occur on pixels which have valid depth values. For example, low color contrast between pixels and the background and/or challenging user poses may result in segmentation errors. Actual depth values may be used to reduce erosion errors in the multi-layer blending. Blur may be reduced for pixels classified as background but with depth values that are within a threshold distance of the average foreground depth value of pixels of the object of interest. For example, a difference value may be determined between a depth value associated with a particular pixel and the average foreground depth value. If the difference value is below a threshold depth difference value, the blur may be reduced for the particular pixel.

The following is an example technique for reducing blur for background pixels that are close to (e.g., within a threshold distance of) the average foreground depth value of the foreground pixels. $Z(x)$ denotes the depth value for a pixel x. μ may be the average depth value of the foreground pixels given by the segmentation mask (e.g., segmentation image 414). A depth closeness factor (DCF) may be determined as follows:

$$DCF(x)=f_1(x)/(f_1(x)f_2(x)),$$

where $f_1(x)=\exp(-(Z(x)-\mu)^2/\sigma_1^2)$ denotes the closeness of $Z(x)$ to mean foreground depth; and $f_2(x) \exp(-(Z(x)-(\mu+t))^2/\sigma_2^2)$ denotes the closeness of $Z(x)$ to nominal background depth defined as μ+t, and t is a constant. For example, t can be 1 meter. $\sigma_1$ and $\sigma_2$ are constants defining the strength of $f_1(x)$ and $f_2(x)$.

Figure 6:
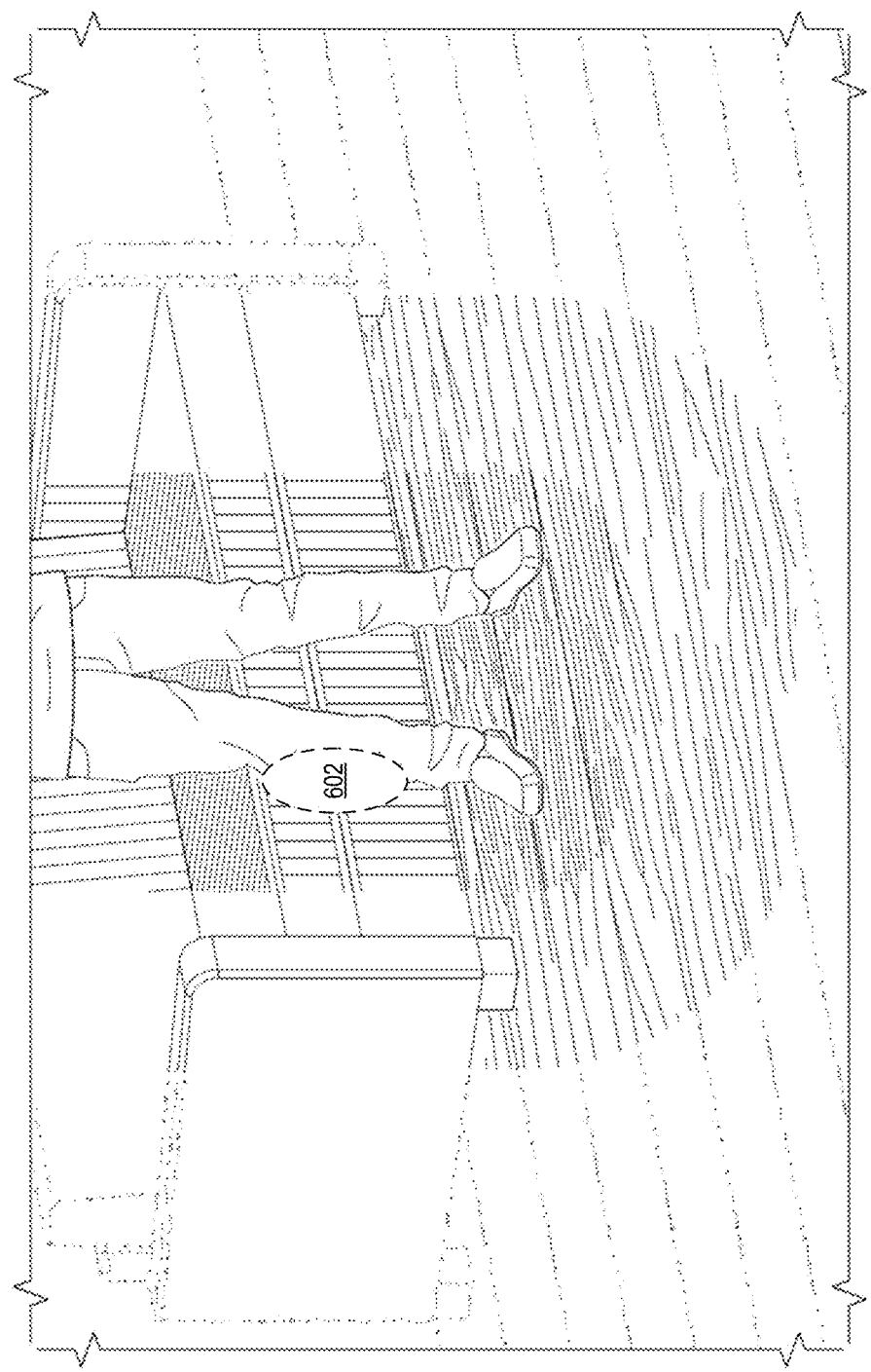
FIG. 6 depicts an example image including a segmentation erosion error region where blurring and/or blending may be modulated based on a depth closeness factor, in accordance with various aspects of the present disclosure.

DCF determines the closeness of each valid depth pixel to the foreground depth. Note that if depth is 0 (e.g., a depth hole), DCF is undefined. Based on DCF, the blending factor may be reduced if a pixel (a) is close to segmentation boundary (e.g., within a threshold distance, in terms of a number of pixels), (b) has a valid depth, and (c) is classified as background by the segmentation mask (e.g., segmentation image 414). The blending factor may be reduced as $F(x)=$ $F(x)-\alpha*DCF(x)$, where α is a constant, tuned using subjective evaluation of images. FIG. 6 depicts an example, where a human subject is standing next to a couch. Due to the positioning of the subject with respect to the couch, a portion of the subject's right leg (the left-most leg in FIG. 6) is closer to the couch relative to the subject's left leg, for example. Accordingly, a segmentation error may occur in region 602 where some pixels in region 602 are classified as background despite being part of the human subject (e.g., an erosion error in region 602). Accordingly, pixels in region 602 may be blurred. Using DCF, the effect of erosion error in region 602 can be visually suppressed, since the depths in those areas are similar to mean foreground depth. Accordingly, the blurring of pixels in region 602 may be reduced by modulating the blending factor based on DCF, as described above.

Although the illustration shown in FIG. 6 appears to have distinct "zones" of blurring, it should be appreciated that actual image data subjected to the various multi-layer blending techniques described herein may appear to be smoothly blurred, wherein foreground image data is kept in sharp focus and blur is progressively increased while traversing the image data away from the segmentation boundary towards an outer edge of the frame.

Modulation of Blending Factor Using Face Detection

Users may often be sensitive to segmentation errors around the face, especially the hair regions. Since segmentation of hair is extremely challenging, there are often segmentation errors in the region of image data representing the subject's hair. To handle such cases, face detection techniques may be used to detect face image data representing the user's face in the image. For example, in FIG. 5, image 502 depicts image data in which a user's face has been detected. In image 502 the face detection is illustrated with a solid box around the user's face. The dashed box around the user's face in image 502 illustrates a defined region of interest around the detected face. If data related to such a "face region" and/or other region of interest is provided to a computing device implementing the various blurring and other image processing techniques described herein, the computing device may be effective to implement a separate blur technique for depth holes surrounding the face region or other region of interest, as described below.

The blending factors may be modulated to reduce the amount of blur by assigning confidence values and using the same or similar techniques as described above with respect to reducing blur for depth hole pixels that are close to the segmentation boundary and within the face region or other region of interest.

Feet Region

In some segmentation examples, a small region quadrilateral, or other shaped region, may be maintained around the subject's feet as sharp, without blurring. This may be desirable so as to avoid generating a representation of the subject in which it appears that the subject is floating in the air. If data related to such a "feet region" is provided to a companion application implementing the various blurring and other image processing techniques described herein, the companion application may be effective to implement a separate blur technique for the feet region, as described below.

To avoid visual artifacts due to floor spot, pixels close to floor spot may be blended using a smooth blending factor based their distance from the floor spot, independent of the blending factors describe above. At the segmentation boundary of the floor spot the pixels may be sharp. At a defined distance from the floor spot the pixels may be blurred with a maximum blur value. Pixels between the segmentation boundary of the floor spot and the maximum blur value pixels may be increasingly blurred as the image data is traversed from the segmentation boundary towards the maximum blur region.

Figure 7:
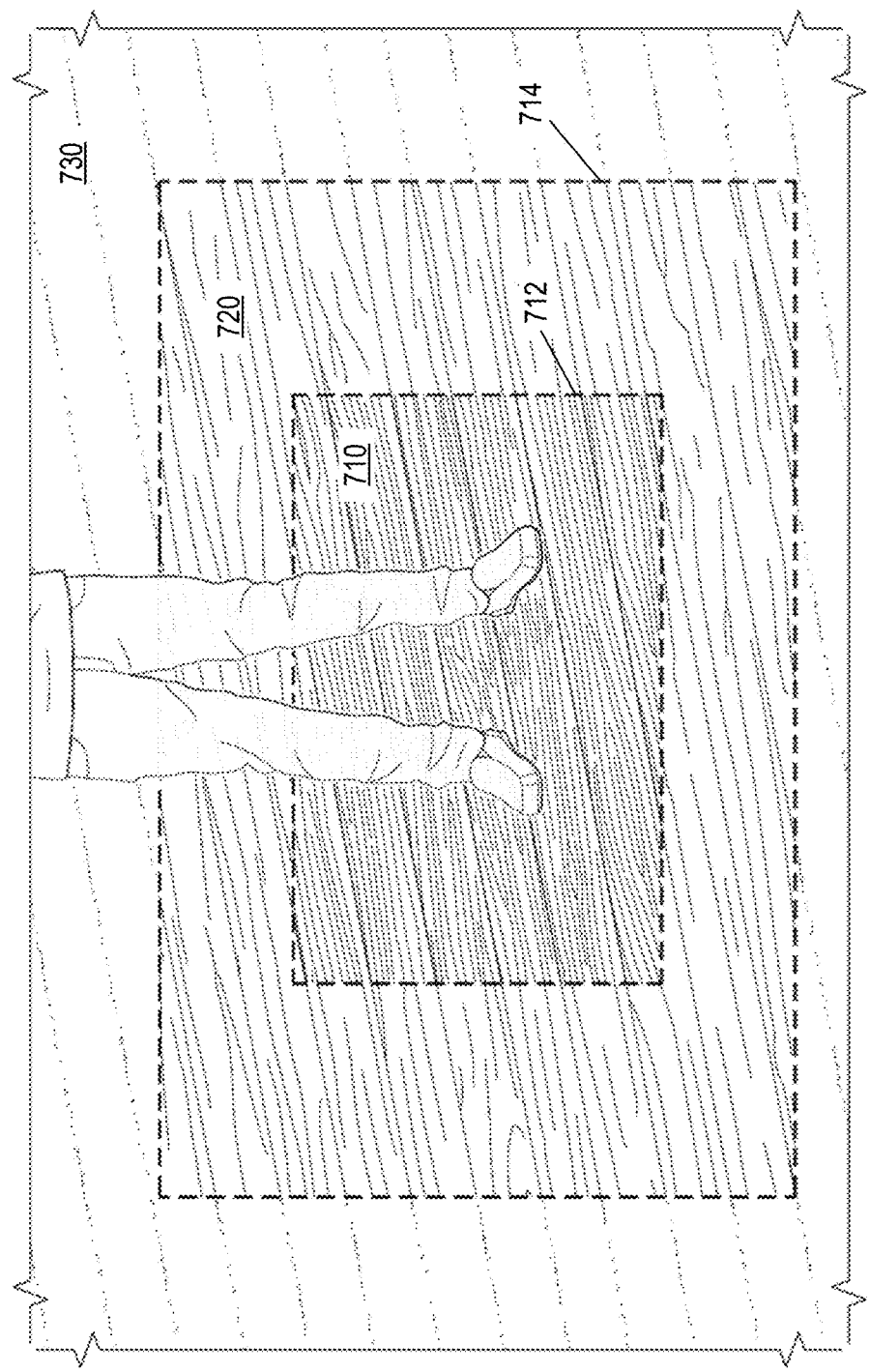
FIG. 7 depicts an example of a sharply-focused floor spot and a blurred background, in accordance with various aspects of the present disclosure.

FIG. 7 depicts an example of a blended representation of a sharply-focused quadrilateral floor spot region 710 with a smoothly-blended transition region 720 to a blurred background region 730.

Although the illustration shown in FIG. 7 appears to have distinct regions of blurring (e.g., floor spot region 710, smoothly-blended transition region 720, and blurred background region 730), it should be appreciated that actual image data subjected to the feet region blending techniques described herein may appear to be smoothly blurred and blended. For example, in FIG. 7, pixels in floor spot region 710 may be kept in sharp focus. Pixels in smoothly-blended transition region 720 may be increasingly blurred as the image data is traversed from the boundary 712 toward boundary 714. Pixels in blurred background region 730 may be uniformly blurred and may be blurred using a low pass image filter (e.g., a Gaussian filter) with the largest blur value (e.g., σ value) among regions 720 and 730.

Adding Bokeh Effects

In SLR cameras, point light sources in the background are naturally blurred resulting in a soft bokeh effect. The shape of the bokeh region depends on the shape of the lens aperture at the corresponding f-stop used for capturing the image. Camera manufactures often design their aperture shapes to be close to circular in order to achieve a pleasing bokeh, by using several (five to six) aperture blades.

Post-processing may be used to achieve such circular bokeh effects by detecting highlights in contiguous regions of pixels within the background region of the color image data and using a disk shape, elliptical shaped, circular shaped, star-shaped, heart-shaped, or other-shaped blur at highlight regions depending on the desired shape of the bokeh effect. The brightness of highlight regions may be increased by a small percentage. The highlight detection may be based on finding points which have high luminance (e.g., above a threshold value) and are brighter than the average luminance value of their neighborhood (e.g., 15 gray levels above the average luminance, within a local region of pixels). For example, in an 8-bit image there may be 255 gray levels in the luminance domain. Highlight detection in an 8-bit image may detect pixels and/or regions of pixels with a luminance value above 240. Additionally, in some examples, if the gray levels of a pixel or group of pixels is 15 gray levels above the average luminance, the pixels may be selected for the bokeh effect (e.g., the disc-shaped blur filter). A non-maximal suppression of pixels within the neighborhood of pixels selected for the bokeh effect may be used to suppress other pixels within the region to avoid too many bokeh points within a region.

Run-Time Considerations

In various examples, techniques are described to reduce the run-time of the image processing techniques described herein. For example, background image data may be down-sampled in order to reduce resolution and may be composed with high resolution foreground color image data at either an original resolution or a resolution that is down-sampled to a smaller degree relative to the background image data. For example, original image data $I_{original}$ may represent a captured digital image, such as RGB image 402 depicted in FIG. 4A. $I_{original}$ may be down-sampled to reduce the resolution. In various examples, $I_{original}$ may be down-sampled by a factor of 2, 4, 8, etc. Subsequently, the multi-layer blending techniques described herein may be applied to the down-sampled image data to generate a background image $R_b$. In various examples, processing the down-sampled image data may conserve processing resources and reduce latency. After performing the multi-layer blending $R_b$ may be up-sampled to the original image resolution. Thereafter, the up-sampled and blended $R_b$ may be composed with the color image data representing the subject or object of interest. The color image data representing the subject or object of interest may be determined from segmentation image 414, in which pixels of the image data are labeled as foreground or background. Pixels in the RGB image 402 that correspond to pixels labeled as foreground in segmentation image 414 may be composed with the up-sampled and blended $R_b$ to generate the final image for display.

Encoding Information in the Segmentation Mask

In some examples, a segmentation image 414, may be referred to as a "segmentation mask". Segmentation image 414 classifies pixels as either foreground or background. The classification can be mapped to high resolution color image data (e.g., RGB image 402). Accordingly, segmentation image 414 may be conceptually thought of as a mask layer of the color image data that classifies each pixel of the high resolution color image data as either a foreground or background pixel.

The segmentation processes described herein use various information. For example, segmentation image data, information related to the location of depth holes, depth values for each pixel, etc. In order to perform a rendering of image data by a companion software application on a display (e.g., display 120 depicted in FIG. 1B), the various information used for segmentation is transmitted to the companion software application from image capture device 116. For example, the various information may be transmitted from image capture device 116 to mobile device 206 (depicted in FIG. 2) executing the companion software application. The various information may be transmitted from image capture device 116 to mobile device 206 over a network, such as network 104. The transmission of the various information described herein can lead to significant latency if all images (e.g., segmentation image 414, RGB image 402, depth hole location information, etc.) are transmitted individually to the companion software application.

In some examples, the latency may be reduced by encoding the various information in the segmentation mask itself (e.g., in segmentation image 414). Segmentation image 414 output is binary. Accordingly denoting a pixel as foreground or background requires only 1 bit of foreground/background indicator data per pixel. As such, an 8 bit mask (e.g., a portable network graphic (PNG) image), may be encoded with the depth information and floor spot information in remaining 7 bits for each pixel. For example, segmentation image 414 may be encoded as a PNG image with the depth information and floor spot information in 7 bits and the foreground indicator data or background indicator data encoded in the remaining bit for each pixel.

An example encoding process is described below. The values used below to denote various information are provided for illustrative purposes only and the encoding process is not meant to be limited to such values. Other values may be substituted without departing from the general encoding technique described herein. In an example encoding process, the segmentation values (foreground indicator data and background indicator data) may be encoded as a first value (e.g., "0") for background and a second value (e.g., "255") for foreground. The floor spot may be encoded as a separate value (e.g., "127"). If a pixel is classified as foreground and is a depth hole, the pixel's value may be changed to a third value (e.g., "254") in the segmentation mask (e.g., segmentation image 414). Similarly, if a pixel is classified as background and is a depth hole, the pixel's value may be changed to a fourth value (e.g., "1") in the segmentation mask. Depth values may be encoded by quantizing the depths in small increments of distance (e.g., every 50 millimeters may represent a different quantized depth value). Assuming a minimum scene depth of 500 mm and maximum scene depth of 3000 mm, 51 values are needed to encode the depth in 50 mm increments. In an example, foreground values can be encoded between 201 and 251 and background values can be encoded between 2 and 52. Accordingly, the depth values may be encoded as:

Encoded depth value=$(Z(x)-500)/50+201$ for a foreground pixel; and

Encoded depth value=$(Z(x)-500)/50+2$ for a background pixel.

Using encoding techniques such as those described above, only a single 8-bit image needs to be transferred from image capture device 116 to the companion software application. In various examples, detected facial coordinates and/or regions of interest (e.g., region of interest 540 depicted in FIG. 5) can be sent as a small meta-data file to the companion software application.

Among other potential benefits of the present disclosure, a system in accordance with the various techniques described herein may be effective to achieve a semantic depth of field effect based on the segmentation techniques used to distinguish background and foreground image data. Accordingly, portions of image data that represent an object of interest may be maintained in sharp focus regardless of whether or not the portions include similar depth values to other portions of the object of interest. For example, a segmentation mask may be generated that classifies all pixels representing a human who is pointing at the image capture device 116 with an outstrectched arm as foreground image data. The segmentation mask may be used to achieve semantic depth of field effects, since the user's outstretched arm is classified as foreground, despite having different depth values relative to the rest of the user. Accordingly, image data classified as foreground in the segmentation mask may be kept in sharp focus even if various pixels of the foreground image data have significantly different depth values relative to the majority of the foreground pixels. Additionally, the segmentation techniques described herein may be used to blur image data classified as background. Further, multi-layer matting techniques, confidence scores, and face detection may be used to modulate blurring and blending of the multiple blur layers to achieve a smoothly blended background with a semanticly defined object of interest kept in sharp focus. Finally, encoding and compression techniques are described to reduce the latency and processor load of the various processing techniques described herein.

Figure 8:
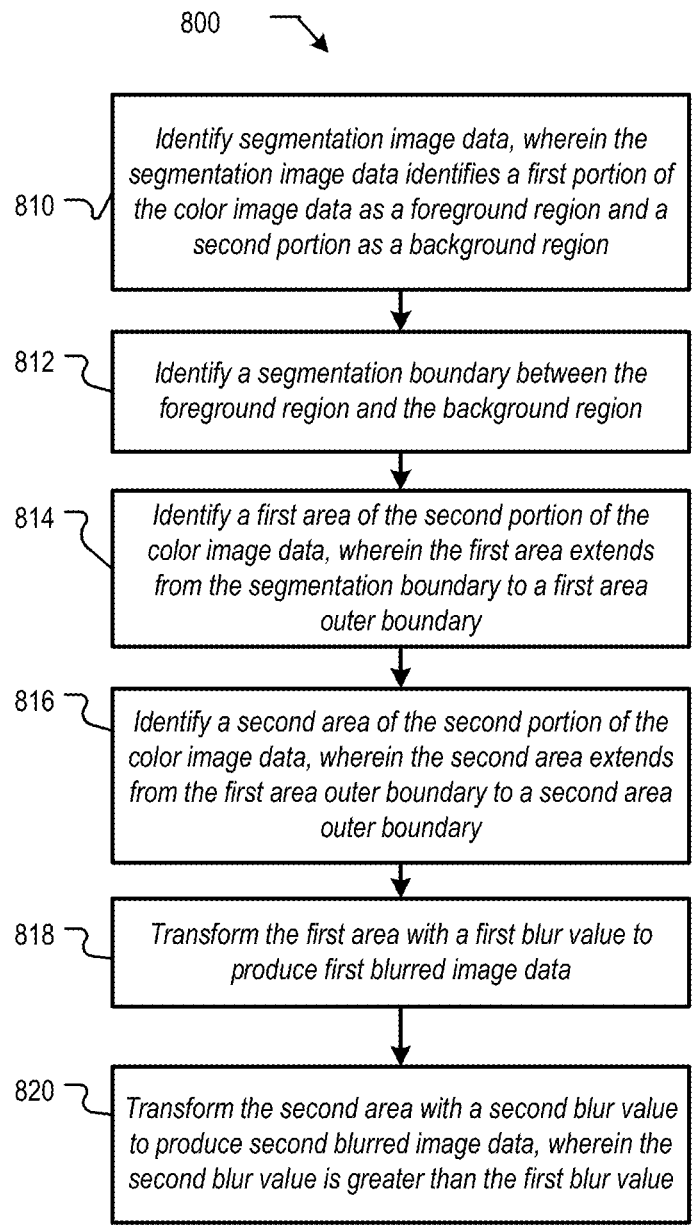
FIG. 8 is a flow chart depicting an example process for multi-layer blurring and blending, in accordance with various aspects of the present disclosure.

FIG. 8 is a flow chart showing an example process for multi-layer blurring and blending of background image data, in accordance with various aspects of the present disclosure. The process flow 800 of FIG. 8 may be executed by a computing device, such as mobile computing device 206, for example, in accordance with various aspects of the present disclosure. The actions of process flow 800 may represent a series of instructions comprising computer-readable machine code executable by a processing unit of a computing device or of a computing device. In various examples, the computer-readable machine code may be comprised of instructions selected from a native instruction set of the computing device and/or an operating system of the computing device. Various actions in process flow 800 may be described with reference to elements of FIGS. 1-7.

At action 810 of process flow 800, a computing device executing a companion software application may identify segmentation image data. The segmentation image data may identify a first portion of the color image data as a foreground region and a second portion as a background region. For example, the computing device may receive segmentation image 414. Segmentation image 414, as previously described, may encode pixels with either foreground indicator data or background indicator data to classify the pixels as foreground or background, respectively. A foreground region may be, for example, a group of pixels classified as foreground. Similarly, a background region may be, for example, a group of pixels classified as background by segmentation image 414.

Processing may proceed from action 810 to action 812: "Identify a segmentation boundary between the foreground region and the background region." At action 812, a computing device such as mobile device 206 may identify a segmentation boundary between the foreground region and the background region. For example, as depicted in FIG. 1A, a segmentation boundary 107 may be identified by the computing device. The segmentation boundary may represent the boundary between image data classified as foreground and image data classified as background.

Processing may proceed from action 812 to action 814: "Identify a first area of the second portion of the color image data, wherein the first area extends from the segmentation boundary to a first area outer boundary." At action 814 a first area of the second portion of background image data may be identified. For example, layer 103 depicted in FIG. 1A may be identified by a computing device executing the companion software application described herein. The first area may have a width in terms of a number of pixels and may be associated with a blur value that may be used to blur pixel component values (e.g., chroma, luma, DCT coefficients, etc.).

Processing may proceed from action 814 to action 816: "Identify a second area of the second portion of the color image data, wherein the second area extends from the first area outer boundary to a second area outer boundary." At action 816, a second area of the second portion of the color image data may be identified. For example, layer 105 depicted in FIG. 1A may be identified by a computing device executing the companion software application described herein. The second area may have a width in terms of a number of pixels and may be associated with a blur value that may be used to blur pixel component values (e.g., chroma, luma, DCT coefficients, etc.).

Processing may proceed from action 816 to action 818: "Transform the first area with a first blur value to produce first blurred image data." At action 818, pixels of the first area may be blurred in the color image data. For example, a low-pass or median pass filter may be used to blur component values of pixels of the first area (e.g., layer 103 in FIG. 1A). In some examples, the blur of the first area may be blended according to the multi-layer blending techniques described herein. In some further examples, the first area may be associated with a first blur value (e.g., $b_0$ in FIG. 1A) and the filter used to blur the second area may be designed according to the first blur value to blur the pixels an amount that corresponds to the first blur value.

Processing may proceed from action 818 to action 820: "Transform the second area with a second blur value to produce second blurred image data, wherein the second blur value is greater than the first blur value." At action 820 pixels of the second area may be blurred with a second blur value. For example, a low-pass or median pass filter may be used to blur component values of the pixels of the second area. In some examples, the blur of the second area (e.g., layer 105 in FIG. 1A) may be blended according to the multi-layer blending techniques described herein. In some further examples, the second area may be associated with a second blur value (e.g., $b_1$ in FIG. 1A) and the filter used to blur the second area may be designed according to the second blur value to blur the pixels an amount that corresponds to the second blur value.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method for generating semantic depth of field, the method comprising:
    receiving color image data representing a human standing in an indoor environment;
    receiving a segmentation mask corresponding to the color image data, wherein the segmentation mask classifies a first set of pixels of the color image data as foreground pixels representing the human and a second set of pixels of the color image data as background pixels representing the indoor environment;
    determining a segmentation boundary in the segmentation mask, wherein the segmentation boundary is a boundary between the foreground pixels and the background pixels;
    determining a first portion of the color image data that surrounds the segmentation boundary, wherein the first portion of the color image data comprises a first number of contiguous background pixels;
    identifying a first blur value associated with the first portion in a lookup table;
    reducing a first respective high frequency component of each pixel of the first portion by a first amount corresponding to the first blur value to generate first blurred image data;
    determining a second portion of the color image data that surrounds the first portion, wherein the second portion of the color image data comprises a second number of contiguous background pixels;
    identifying a second blur value associated with the second portion in the lookup table;
    reducing a second respective high frequency component of each pixel of the second portion by a second amount corresponding to the second blur value to generate second blurred image data;
    determining a blend strength parameter $F_k$ for a first pixel of the second portion of the color image data according to an equation $F_k = a*D_{seg} + b$, where a and b are constants and where $D_{seg}$ represents a distance, in terms of a number of pixels, between the first pixel and a nearest foreground pixel;
    blending a first value of the first pixel of the second portion of the color image data with a second value of a second pixel of the first portion of the color image data according to a blending equation $I_k = I_{k-1}*F_k + I_b*(1-F_k)$, where $I_k$ represents a blended value of the first pixel of the second portion of the color image data, $I_{k-1}$ represents the second value of the second pixel of the first portion of the color image data, and $I_b$ represents a blurred value of the first pixel among the second blurred image data; and
    generating a modified image comprising the first set of pixels of the color image data, the first blurred image data, and the second blurred image data.

2. The method of claim 1, further comprising:
    identifying a third pixel of the first portion of the color image data;
    determining a first distance in terms of a first number of pixels between the third pixel and a fourth pixel of the second set of pixels, wherein the fourth pixel does not have corresponding depth information;
    determining that the first distance is less than a threshold depth hole distance; and
    reducing a third high frequency component of the third pixel by a third amount corresponding to a third blur value to generate a third blurred pixel, wherein the third blur value is less than the first blur value.

3. The method of claim 1, further comprising:
    identifying a third pixel of the first portion of the color image data;
    determining a depth value associated with the third pixel from the segmentation mask;
    determining an average depth value of the foreground pixels;
    determining that a difference value between the depth value associated with the third pixel and the average depth value is lower than a threshold depth difference value;
    identifying a third blur value associated with the third pixel; and
    reducing a third high frequency component of the third pixel by a third amount corresponding to the third blur value to generate a third blurred pixel, wherein the third blur value is less than the first blur value.

4. A method for image editing, comprising:
    receiving segmentation image data, wherein the segmentation image data identifies a first portion of color image data as a foreground region and a second portion of the color image data as a background region;
    determining a segmentation boundary between the foreground region and the background region;
    determining a first area of the second portion of the color image data, wherein the first area extends from the segmentation boundary to a first area outer boundary and comprises a first plurality of pixels;
    determining a second area of the second portion of the color image data, wherein the second area extends from the first area outer boundary to a second area outer boundary and comprises a second plurality of pixels;
    reducing a first respective high frequency component of each pixel of the first plurality of pixels according to a first blur value to generate first blurred image data;
    reducing a second respective high frequency component of each pixel of the second plurality of pixels according to a second blur value to generate second blurred image data, wherein the second blur value is greater than the first blur value resulting in an increased blurring of the second blurred image data; and
    generating a first blended representation of the first area and the second area by blending the first blurred image data with the second blurred image data, the blending based at least in part on a blend strength parameter, wherein the blend strength parameter is determined based at least in part on a first distance, in terms of a number of pixels, between a first pixel for which the blend strength parameter is determined and a nearest foreground pixel to the first pixel.

5. The method of claim 4, further comprising:
generating a mask layer using the color image data and the segmentation image data, wherein the mask layer excludes pixels in the foreground region; and
applying a bilateral filter to the mask layer along the segmentation boundary to blur color image data corresponding to pixels of the background region adjacent to the segmentation boundary.

6. The method of claim 4, further comprising:
determining a second distance in terms of a first number of pixels between a first pixel and a second pixel, wherein the second pixel does not have corresponding depth information in the segmentation image data;
determining a third distance in terms of a second number of pixels between a third pixel and the second pixel, wherein the second distance is less than the third distance; and
reducing a first amount of blur of the first pixel relative to a second amount of blur of the second pixel based at least in part on the second distance being less than the third distance.

7. The method of claim 4, further comprising:
determining a first number of pixels between a first pixel and a first closest portion of the segmentation boundary;
determining a second number of pixels between a second pixel and a second closest portion of the segmentation boundary, wherein the first number of pixels is less than the second number of pixels; and
reducing a first amount of blur of the first pixel relative to a second amount of blur of the second pixel based at least in part on the first number of pixels being less than the second number of pixels.

8. The method of claim 4, further comprising:
comparing a depth value of a second pixel of the background region to an average depth value of pixels of the foreground region;
determining that the depth value is within a threshold tolerance of the average depth value of pixels of the foreground region; and
reducing a first amount of blur of the second pixel.

9. The method of claim 4, further comprising:
identifying face image data representing a human face in the color image data;
identifying a region of interest portion of the color image data, wherein the region of interest portion comprises the face image data and second image data at least partially surrounding the face image data;
identifying a second pixel included in the region of interest portion and the background region, wherein the second pixel does not have corresponding depth information; and
reducing an amount of blur of the second pixel.

10. The method of claim 4, further comprising:
identifying feet image data representing feet of a subject in the color image data;
classifying a feet region surrounding the feet image data as a part of the foreground region;
generating third blurred image data by applying a first low pass image filter to a second pixel of the background region to reduce high frequency components of the second pixel by a first amount, wherein the second pixel is located adjacent to the feet region; and
generating fourth blurred image data by applying a second low pass image filter to a third pixel of the background region to reduce high frequency components of the third pixel by a second amount, wherein the third pixel is located at a second distance from the feet region, wherein the second amount is greater than the first amount and causes the third pixel to appear more blurred relative to the second pixel when the second pixel and the third pixel are rendered on a display.

11. The method of claim 4, further comprising:
determining a first region of contiguous pixels in the background region;
determining a first average luminance value of the first region of contiguous pixels;
determining a second region of contiguous pixels in the background region;
determining a second average luminance value of the second region of contiguous pixels, wherein the first average luminance value is greater than the second average luminance value; and
generating a bokeh region by filtering the first region of contiguous pixels with an elliptical shaped filter.

12. The method of claim 4, further comprising:
down-sampling the color image data from a first resolution to a second resolution, prior to the reducing the first respective high frequency component of each pixel of the first plurality of pixels and the reducing the second respective high frequency component of each pixel of the second plurality of pixels, wherein the second resolution is lower than the first resolution;
up-sampling the first blended representation from the second resolution to the first resolution; and
generating transformed image data, wherein the transformed image data comprises:
the first blended representation of the first area and the second area; and
the foreground region.

13. A computing device comprising:
a memory; and
at least one processor in communication with the memory, the at least one processor effective to execute instructions that when executed by the at least one processor cause the computing device to perform a method comprising:
receiving color image data;
receiving segmentation image data, wherein the segmentation image data identifies a first portion of the color image data as a foreground region and a second portion of the color image data as a background region;
determining a segmentation boundary between the foreground region and the background region;
determining a first area of the second portion of the color image data, wherein the first area extends from the segmentation boundary to a first area outer boundary and comprises a first plurality of pixels;
determining a second area of the second portion of the color image data, wherein the second area extends from the first area outer boundary to a second area outer boundary and comprises a second plurality of pixels;
reducing a first respective high frequency component of each pixel of the first plurality of pixels according to a first blur value to generate first blurred image data;

reducing a second respective high frequency component of each pixel of the second first plurality of pixels according to a second blur value to generate second blurred image data, wherein the second blur value is greater than the first blur value resulting in an increased blurring of the second blurred image data; and generating a first blended representation of the first area and the second area by blending the first blurred image data with the second blurred image data, the blending based at least in part on a blend strength parameter, wherein the blend strength parameter is determined based at least in part on a first distance, in terms of a number of pixels, between a first pixel for which the blend strength parameter is determined and a nearest foreground pixel to the first pixel.

14. The computing device of claim 13, wherein the instructions when executed by the at least one processor are further effective to cause the computing device to perform the method further comprising:

generating a mask layer using the color image data and the segmentation image data, wherein the mask layer excludes pixels in the foreground region; and applying a bilateral filter to the mask layer along the segmentation boundary to blur color image data corresponding to pixels of the background region adjacent to the segmentation boundary.

15. The computing device of claim 13, wherein the instructions when executed by the at least one processor are further effective to cause the computing device to perform the method further comprising:

determining a second distance in terms of a first number of pixels between a first pixel and a second pixel, wherein the second pixel does not have corresponding depth information in the segmentation image data;

determining a third distance in terms of a second number of pixels between a third pixel and the second pixel, wherein the second distance is less than the third distance; and reducing a first amount of blur of the first pixel relative to a second amount of blur of the second pixel based at least in part on the second distance being less than the third distance.

16. The computing device of claim 13, wherein the instructions when executed by the at least one processor are further effective to cause the computing device to perform the method further comprising:

determining a first number of pixels between a first pixel and a first closest portion of the segmentation boundary;

determining a second number of pixels between a second pixel and a second closest portion of the segmentation boundary, wherein the first number of pixels is less than the second number of pixels; and reducing a first amount of blur of the first pixel relative to a second amount of blur of the second pixel based at least in part on the first number of pixels being less than the second number of pixels.

17. The computing device of claim 13, wherein the instructions when executed by the at least one processor are further effective to cause the computing device to perform the method further comprising:

comparing a depth value of a second pixel of the background region to an average depth value of pixels of the foreground region;

determining that the depth value is within a threshold tolerance of the average depth value of pixels of the foreground region; and reducing a first amount of blur of the second pixel.

18. The computing device of claim 13, wherein the instructions when executed by the at least one processor are further effective to cause the computing device to perform the method further comprising:

identifying face image data representing a human face in the color image data;

identifying a region of interest portion of the color image data, wherein the region of interest portion comprises the face image data and second image data at least partially bordering the face image data;

identifying a second pixel included in the region of interest portion and the background region, wherein the second pixel does not have corresponding depth information; and reducing an amount of blur of the second pixel.

19. The computing device of claim 13, wherein the instructions when executed by the at least one processor are further effective to cause the computing device to perform the method further comprising:

identifying feet image data representing feet in the color image data;

classifying a feet region surrounding the feet image data as a part of the foreground region;

generating third blurred image data by applying a first low pass image filter to a second pixel of the background region to reduce high frequency components of the second pixel by a first amount, wherein the second pixel is located adjacent to the feet region; and generating fourth blurred image data by applying a second low pass image filter to a third pixel of the background region to reduce high frequency components of the third pixel by a second amount, wherein the third pixel is located at a distance from the feet region, wherein the second amount is greater than the first amount and causes the third pixel to appear more blurred relative to the second pixel when the second pixel and the third pixel are rendered on a display.

20. The computing device of claim 13, wherein the instructions when executed by the at least one processor are further effective to cause the computing device to perform the method further comprising:

determining a first region of contiguous pixels in the background region;

determining a first average luminance value of the first region of contiguous pixels;

determining a second region of contiguous pixels in the background region;

determining a second average luminance value of the second region of contiguous pixels, wherein the first average luminance value is greater than the second average luminance value; and generating a bokeh region by filtering the first region of contiguous pixels with an elliptical shaped filter.

* * * * *